US012625464B2

(12) United States Patent
Shao et al.

(10) Patent No.: US 12,625,464 B2
(45) Date of Patent: May 12, 2026

(54) CONDUCTIVE PART, PROCESS CARTRIDGE, AND PROCESS CARTRIDGE SET

(71) Applicant: Zhuhai Pantum Electronics Co., Ltd., Zhuhai (CN)

(72) Inventors: Zhe Shao, Zhuhai (CN); Hongjian Yang, Zhuhai (CN); Hongjie Yu, Zhuhai (CN); Xiangchao Xia, Zhuhai (CN)

(73) Assignee: Zhuhai Pantum Electronics Co., Ltd., Zhuhai (CN)

( * ) Notice: Subject to any disclaimer, the term of this patent is extended or adjusted under 35 U.S.C. 154(b) by 0 days.

(21) Appl. No.: 18/759,107

(22) Filed: Jun. 28, 2024

(65) Prior Publication Data

US 2024/0353793 A1 Oct. 24, 2024

Related U.S. Application Data

(63) Continuation of application No. PCT/CN2022/141036, filed on Dec. 22, 2022.

(30) Foreign Application Priority Data

Dec. 29, 2021 (CN) ......................... 202123372434.9
Nov. 23, 2022 (CN) ......................... 202211470376.X

(51) Int. Cl.
*G03G 21/18* (2006.01)
*G03G 15/06* (2006.01)
*G03G 21/16* (2006.01)

(52) U.S. Cl.
CPC ....... *G03G 21/1871* (2013.01); *G03G 15/065* (2013.01); *G03G 21/1652* (2013.01);
(Continued)

(58) Field of Classification Search
CPC ............. G03G 21/1871; G03G 15/065; G03G 21/1652; G03G 21/1814; G03G 21/1828; G03G 21/1842; G03G 21/1867
See application file for complete search history.

(56) References Cited

U.S. PATENT DOCUMENTS 6,029,019 A * 2/2000 Kawai ................ G03G 21/1867 399/13
6,226,476 B1 5/2001 Miyabe et al.
(Continued)

FOREIGN PATENT DOCUMENTS

CN 203166171 U 8/2013
CN 204347446 U 5/2015
(Continued)

OTHER PUBLICATIONS

The World Intellectual Property Organization (WIPO) International Search Report for PCT/CN2022/141036 Mar. 15, 2023 7 Pages (including translation).

*Primary Examiner* — Sandra Brase
(74) *Attorney, Agent, or Firm* — Anova Law Group, PLLC

(57) ABSTRACT

The present disclosure provides a conductive part, a process cartridge, and a process cartridge set. The conductive part includes an electrical receiving portion; an electrical output portion; and an electrical transfer portion. The electrical transfer portion is electrically connected to the electrical receiving portion, the electrical output portion and an electrical conduction portion respectively; and configured to transfer power received by the electrical receiving portion to the electrical output portion and the electrical conduction portion. When the conductive part is configured to conduct electricity to the process cartridge, the electrical receiving portion is electrically connected to a power supply at an outside of current process cartridge to receive a first voltage.
(Continued)

The electrical output portion is electrically connected to an image-forming member in current process cartridge and transfers a second voltage to the image-forming member; and the electrical conduction portion outputs a third voltage.

20 Claims, 15 Drawing Sheets

(52) U.S. Cl.
CPC ..... *G03G 21/1814* (2013.01); *G03G 21/1828* (2013.01); *G03G 21/1842* (2013.01); *G03G 21/1867* (2013.01)

(56) References Cited

U.S. PATENT DOCUMENTS

| | | | | |
|---|---|---|---|---|
| 6,345,164 | B1 | 2/2002 | Yokomori et al. | |
| 2008/0159775 | A1 | 7/2008 | Koishi et al. | |
| 2017/0285570 | A1* | 10/2017 | Sakata | G03G 21/1871 |

FOREIGN PATENT DOCUMENTS

| | | | |
|---|---|---|---|
| CN | 105929661 | A | 9/2016 |
| CN | 210924199 | U | 7/2020 |
| CN | 211554642 | U | 9/2020 |
| CN | 111812955 | A | 10/2020 |
| CN | 112965354 | A | 6/2021 |
| CN | 113433811 | A | 9/2021 |
| CN | 214375840 | U | 10/2021 |
| CN | 215297950 | U | 12/2021 |
| JP | 2003122230 | A | 4/2003 |
| JP | 2004077692 | A | 3/2004 |
| WO | 2014101680 | A1 | 7/2014 |

* cited by examiner

CONDUCTIVE PART, PROCESS CARTRIDGE, AND PROCESS CARTRIDGE SET

CROSS-REFERENCE TO RELATED APPLICATION

This application is a continuation application of international application No. PCT/CN2022/141036, filed on Dec. 22, 2022, which claims the priority to Chinese patent application No. 202123372434.9, filed on Dec. 29, 2021, and No. 202211470376.X, filed on Nov. 23, 2022, the entirety of all of which is incorporated herein by reference.

TECHNICAL FIELD

The present disclosure generally relates to the field of image-forming apparatus technology and, more particularly, relates to a conductive part, a process cartridge, and a process cartridge set.

BACKGROUND

Printers (e.g., laser printers) are printing output devices that combine laser scanning technology and electrophotography technology. The laser printers include monochrome laser printers and color laser printers; and the laser printers include main bodies.

A process cartridge is an essential structure in the laser printer. The process cartridge is installed in the main body of the laser printer. The process cartridge includes image-forming members such as a photosensitive drum, a developing roller, and a charging roller. These image-forming members are configured to form toner images. When the laser printer is operating, a voltage needs to be applied to the photosensitive drum, the developing roller and the charging roller to adsorb and transfer toner; and in order to obtain the voltage, the process cartridge needs to be electrically connected to the main body of the laser printer.

In the existing technology, in order to provide the voltage to the process cartridge, a plurality of first electrical contact portions (conductive contacts) are disposed on the process cartridge, and a plurality of second electrical contact portions (conductive terminals) are disposed on the main-body side, such that each image-forming member may be electrically connected to the main body through each of the first electrical contact portions and each of the second contact portions; and the second electrical contact portions on the main-body side are formed using elastic conductive parts. Therefore, when the first electrical contact portion of the process cartridge is in contact with the second electrical contact portion of the main body, the process cartridge is subject to the elastic force of the second electrical contact portion on the main-body side. If there are more second electrical contact portions, the elastic force exerted on the process cartridge is greater, which may affect the installation stability of the process cartridge to a certain extent. In particular, the color laser printer includes a plurality of process cartridges; the photosensitive drum, the developing roller and the charging roller in each process cartridge are electrically connected to the main body respectively, and even the process cartridge chip is also electrically connected to the second electrical contact portion on the main-body side through the elastic conductive part, which may result in the need to dispose more second electrical contacts on the main body. Eventually, the elastic force generated between the process cartridge and the main body may become larger to affect the installation stability of the process cartridge, and the structure of the image-forming apparatus may also become more complex.

SUMMARY

One aspect of the present disclosure provides a conductive part, installed in a process cartridge. The conductive part includes an electrical receiving portion; an electrical output portion; and an electrical transfer portion, electrically connected to the electrical receiving portion, the electrical output portion and an electrical conduction portion respectively; and configured to transfer power received by the electrical receiving portion to the electrical output portion and the electrical conduction portion. When the conductive part is configured to conduct electricity to the process cartridge, the electrical receiving portion is electrically connected to a power supply at an outside of current process cartridge to receive a first voltage from the outside of current process cartridge. The electrical output portion is electrically connected to an image-forming member in current process cartridge and transfers a second voltage to the image-forming member; and the electrical conduction portion outputs a third voltage to the outside of current process cartridge.

Another aspect of the present disclosure provides a process cartridge, where the process cartridge is detachably installed on a main body of an image-forming apparatus. The process cartridge includes a housing, where a developer accommodating chamber is disposed in the housing and configured to contain a developer; an image-forming member, disposed at the housing; and a conductive part, including an electrical receiving portion, an electrical transfer portion, and an electrical output portion, where the electrical transfer portion is electrically connected to the electrical receiving portion, the electrical output portion respectively and configured to transfer power received by the electrical receiving portion to the electrical output portion. When the conductive part is configured to conduct electricity to the process cartridge, the electrical receiving portion is electrically connected to a power supply at an outside of current process cartridge to receive a first voltage from the outside of current process cartridge. The electrical output portion is electrically connected to an image-forming member in current process cartridge and transfers a second voltage to the image-forming member.

Another aspect of the present disclosure provides a process cartridge set. The process cartridge set includes a first process cartridge, including a first image-forming member and a first conductive part, where a first conductive part is electrically connected to the first image-forming member; the first conductive part includes a first electrical receiving portion, a first electrical transfer portion, a first electrical output portion and a first electrical conduction portion; and the first electrical transfer portion is electrically connected to the first electrical receiving portion, the first electrical output portion and the first electrical conduction portion respectively; further includes a second process cartridge, including a second image-forming member and a second conductive part, where a second conductive part is electrically connected to the second image-forming member; the second conductive part includes a second electrical receiving portion, a second electrical transfer portion, a second electrical output portion and a second electrical conduction portion; and the second electrical transfer portion is electrically connected to the second electrical receiving portion, the second electrical output portion and the second electrical conduction portion respectively; and further includes the first electrical receiving portion is configured to be electrically connected to a second conductive terminal on a main-body side of an image-forming apparatus; the first electrical output portion is electrically connected to the first image-forming member; the second electrical output portion is electrically connected to the second image-forming member; and the first electrical conduction portion is configured to be electrically connected to the second electrical receiving portion.

Compared with the existing technology, in the present disclosure, the conductive part may include the electrical receiving portion, the electrical output portion, the electrical conduction portion and the electrical transfer part; the electrical transfer portion may be electrically connected to the electrical receiving portion, the electrical output portion and the electrical conduction portion respectively; the electrical transfer portion may be configured to transfer the power received by the electrical receiving portion to the electrical output portion and the electrical conduction portion; when the conductive part is configured to conduct electricity to the process cartridge, the electrical receiving portion may be electrically connected to the power supply outside current process cartridge to receive the first voltage from the outside of current process cartridge; the electrical output portion may be electrically connected to the image-forming member in current process cartridge and transfer the second voltage to the image-forming member; and the electrical conduction portion may output the third voltage to the outside of current process cartridge, such that certain process cartridges may obtain power through the voltage transmitted by other process cartridges without directly contacting the conductive terminals on the main-body side of the image-forming apparatus. Therefore, the quantity of conductive terminals on the main-body side of the image-forming apparatus may be reduced, or even only one conductive terminal may be disposed, thereby reducing the elastic force generated between the process cartridge and the main body, improving the installation stability of the process cartridge, reducing the costs and simplifying the structure of the image-forming apparatus.

DETAILED DESCRIPTION

Figure 1:
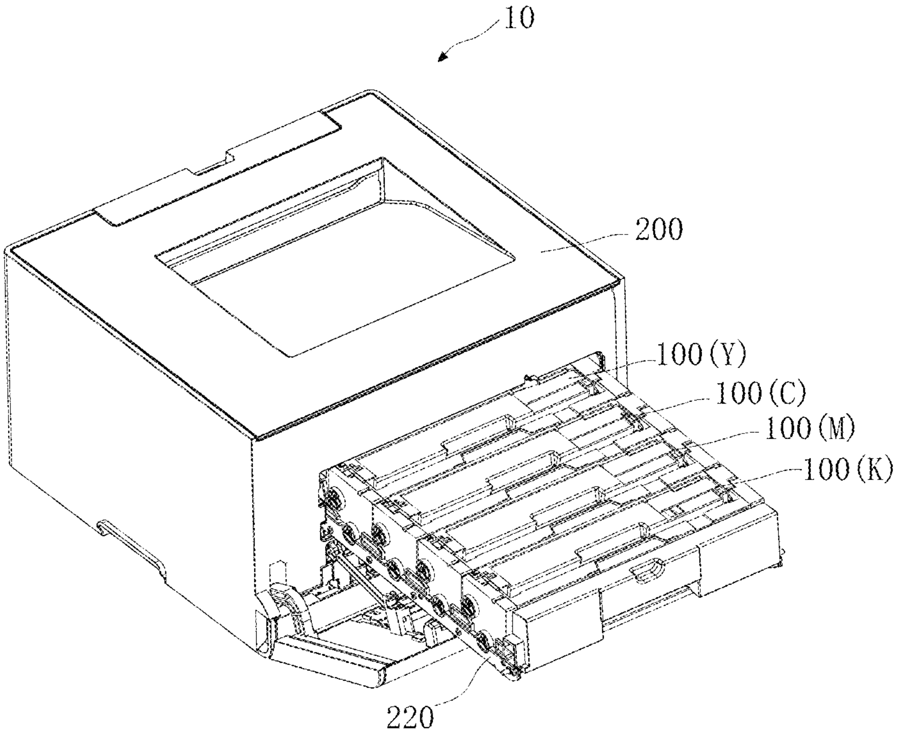
FIG. 1 illustrates a structural schematic of an image-forming apparatus provided by exemplary embodiments of the present disclosure.

In order to clearly describe the objectives, technical solutions and advantages of the present disclosure, the present disclosure is further described in detail with reference to the accompanying drawings and embodiments hereinafter. It should be understood that specific embodiments described herein are only configured to explain the present disclosure, but not to limit the present disclosure.

In the specification of the present disclosure, unless otherwise expressly specified and limited, the terms "first" and "second" are only used for the purpose of description and should not be construed as indicating or implying relative importance. Unless otherwise specified or explained, the term "plurality" refers to two or more; the terms "connection", "fixation" and the like should be understood in a broad sense. For example, "connection" may be a fixed connection, a detachable connection, an integral connection, or an electrical connection; and may be a direct connection or an indirect connection through an intermediate medium. For those skilled in the art, specific meanings of above-mentioned terms in the present disclosure may be understood according to specific situations.

In the specification of the present disclosure, it should be understood that directional words such as “upper” and “lower” described in embodiments of the present disclosure are described from the angles shown in the drawings and should not be construed as a limitation on embodiments of the present disclosure. In addition, in the context of the present disclosure, it should also be understood that when an element may be referred to being “on” or “under” another element, it may not only be directly connected “on” or “under” another element, but also indirectly connected “on” or “under” another element through intermediate elements.

In the existing technology, a process-cartridge side and a main-body side of the image-forming apparatus may both include electrical contact portions such as conductive planes, conductive probes, and conductive coils. For convenience of explanation, the electrical contact portion disposed on the main body of the image-forming apparatus is referred to a conductive terminal, and the electrical contact portion disposed on the process cartridge is referred to a conductive contact.

In the existing technology, each process cartridge may include a plurality of image-forming members, such as a photosensitive drum, a developing roller, a charging roller, and the like, where the photosensitive drum, the developing roller, and the charging roller all need the application of voltage to perform the image-forming process. Correspondingly, the main body may be disposed with conductive terminals that are electrically connected to the photosensitive drum, the developing roller, and the charging roller, thereby supplying power to the photosensitive drum, the developing roller, and the charging roller. In addition, a plurality of process cartridges (e.g., four) may be installed on the main body. Therefore, a quantity 4 n of conductive terminals may need to be disposed on the main body accordingly, where n is the quantity of image-forming members to be powered. In such way, the quantity of conductive terminals disposed on the main body may be relatively large, which may result in a complex structure of the main body. Moreover, a plurality of electrical contact portions may be between the main body and the process cartridge. The conductive terminals on the main body may be elastic parts, a large elastic force may be needed between the main body and the process cartridge to achieve electrical contact. Therefore, the main body may need relatively high strength, which may also result in a more complex structure of the main body and a relatively high cost of the image-forming apparatus.

Embodiments of the present disclosure provide a conductive part, an image-forming assembly, a process cartridge, a process cartridge set, and an image-forming apparatus. An image-forming member may be installed on a housing of the process cartridge, and a conductive part for providing electrical energy to the image-forming member may be disposed on the housing of the process cartridge. The conductive part may include an electrical receiving portion, an electrical output portion, an electrical conduction portion and an electrical transfer portion. The electrical transfer portion may include the first conductive sheet and the second conductive sheet. The length of the first conductive sheet may extend along the first direction, the length of the second conductive sheet may extend along the second direction, and the first direction may intersect the second direction. The first end portion of the first conductive sheet may be electrically connected to the electrical receiving portion, the second end portion of the first conductive sheet may be electrically connected to the electrical conduction portion, and one end of the second conductive sheet may be electrically connected to the electrical output portion. When the process cartridge is installed in the image-forming apparatus, the first conductive sheet and the second conductive sheet may be electrically connected to each other; the electrical receiving portion may be configured to receive the power voltage provided by a power supply unit; and the power voltage may be transferred to the electrical output portion and the electrical conduction portion through the electrical transfer portion (obviously, the first conductive sheet or the second conductive sheet may also be electrically connected to the power supply unit through other parts to receive electrical energy). The electrical conduction portion may be configured to be electrically connected to each process cartridge, such that each process cartridge may be electrically connected to each other, and the voltage may be transferred through the electrical conduction portion; and the electrical output portion may be configured to be electrically connected to the image-forming member. Therefore, when above-mentioned conductive part is configured to conduct electricity to the process cartridge, the electrical receiving portion may be electrically connected to the power outside current process cartridge to receive the first voltage from the outside of current process cartridge; the electrical output portion may be electrically connected to the image-forming member currently in the process cartridge and transfer the second voltage to the image-forming member; and the electrical conduction portion may output the third voltage to the outside of current process cartridge. It should be noted that the voltages of the first voltage, the second voltage, and the third voltage may be same or different, which may not be limited herein.

Furthermore, when the plurality of above-mentioned process cartridges is installed in the image-forming apparatus, the process cartridge directly and electrically connected to the image-forming apparatus is referred to the first process cartridge, and other process cartridges that are not directly and electrically connected (indirectly electrical connection) to the image-forming apparatus are referred to second process cartridges. Therefore, the electrical receiving portion of the conductive part disposed on the first process cartridge may be connected to the image-forming apparatus; the electrical conduction portion of the conductive part disposed on the first process cartridge may be connected to the electrical receiving portion of the conductive part disposed on adjacent second process cartridge; and other second process cartridges may implement electrical connection through the electrical receiving portions and the electrical conduction portions. In such way, above-mentioned image-forming member installed on the second process cartridge may be powered by the voltage transferred by the first process cartridge directly and electrically connected to the image-forming apparatus, which may not rely on the main body of the image-forming apparatus to directly provide voltage. Therefore, the conductive terminals disposed on the main body of the image-forming apparatus for being in contact with all second process cartridges to provide power to the image-forming members in all second process cartridges may be omitted. Specifically, when the plurality of above-mentioned process cartridges are applied to the image-forming apparatus simultaneously, the electrical receiving portion of the conductive part corresponding to the second process cartridge may be electrically connected to the electrical conduction portion of the conductive part corresponding to adjacent second process cartridge. In such way, corresponding to the plurality of above-mentioned image-forming members, the main body of the image-forming apparatus may only need to be disposed with one conductive terminal, which may reduce the quantity of conductive terminals on the main body, simplify the structure of the main body, and reduce the formation cost of the image-forming apparatus.

Referring to FIG. 1, an image-forming apparatus 10 is provided in one embodiment. The image-forming apparatus 10 may be a laser printer, a laser copying machine, or the like. Each process cartridge may be detachably installed in the image-forming apparatus.

The image-forming apparatus 10 may include a main body 200, and an optical scanning unit (not shown), a paper feeding unit (not shown), a fixing unit (not shown), a process cartridge described below and the like which are disposed on the main body 200. The main body 200 may be disposed with a process cartridge installation portion for installing the process cartridge and an electrical contact portion for supplying power to the process cartridge. The process cartridge may be detachably installed on the process cartridge installation portion. The working principle and process of the image-forming apparatus 10 are described hereinafter. The optical scanning unit may perform exposure on the process cartridge to convert image information into an electrostatic latent image; the process cartridge may convert the electrostatic latent image into a toner image; the paper feeding unit may transport paper to the position of the process cartridge, and then the toner image may be transferred to the paper; next, the paper feeding unit may transport the paper to the fixing unit, where the toner image may be fixed on the paper through heat and pressure; subsequently, the paper feeding unit may output the paper to the outside of the image-forming apparatus 10.

The image-forming apparatus 10 may further include a communication unit (not shown). The communication unit may be configured to be connected with terminal equipment such as mobile phones and computers, such that the image-forming apparatus 10 may obtain printing tasks sent by the terminal equipment. The communication unit may be a module, including a cellular network (e.g., 2G, 3G, 4G, 5G and the like), a wireless network (e.g., Wi-Fi), a wireless sensing network (e.g., Bluetooth), a near field communication unit (NFC) and/or the like.

The process cartridge set may include a plurality of process cartridges, for example, a first process cartridge 100(K), a second process cartridge 100(M), a third process cartridge 100(C), and a fourth process cartridge 100(Y), where K, M, C, and Y may indicate toner colors, where the toner colors in the plurality of process cartridges may be same or different. Exemplarily, all process cartridges may store toners of different colors, such that the image-forming apparatus may form either black images or color images on the paper.

In order to facilitate simultaneous removal and installation of the plurality of process cartridges (e.g., the first process cartridge 100(K), the second process cartridge 100(M), the third process cartridge 100(C) and the fourth process cartridge 100(Y)), in some optional implementation manners, the image-forming apparatus 10 may further include a moving part 220 removably installed in the main body 200 for accommodating the plurality of process cartridges including the first process cartridge 100(K), the second process cartridge 100(M), the third process cartridge 100(C), the fourth process cartridge 100(Y) and the like. When the moving part 220 is outside the main body 200, the plurality of process cartridges may be removed from the moving part 220. That is, the user may push and pull the moving part 220 to move the plurality of process cartridges simultaneously, which may be convenient for removal and installation.

Figure 11:
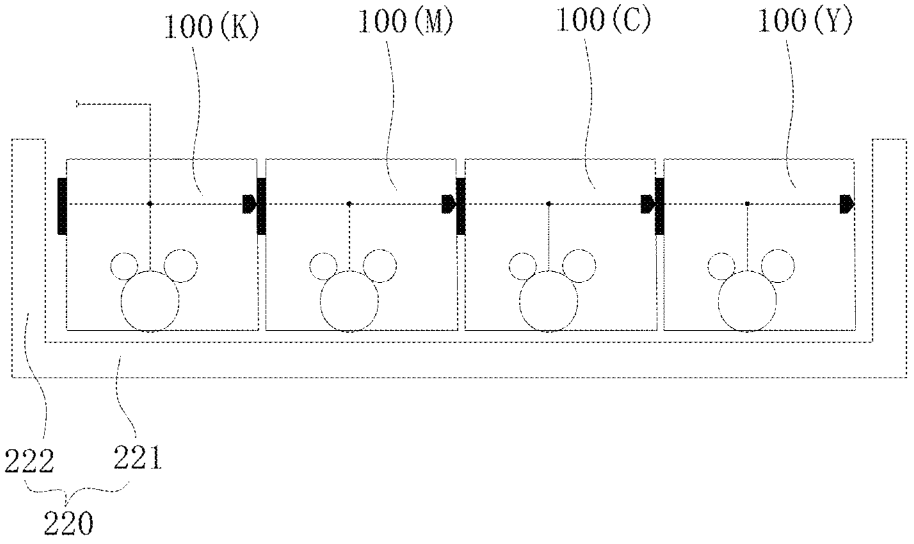
FIG. 11 illustrates a principle schematic of electrical connection of a plurality of process cartridges in FIG. 10.

The moving part 220 may be a rod-shaped or plate-shaped structural member. In some embodiments, the moving part 220 may include a bottom plate 221 and a side plate 222 (as shown in FIG. 11). The bottom plate 221 and the side plates 222 may be connected to form a chamber with an opening. The bottom plate 221 may be configured to support the plurality of process cartridges including the first process cartridge 100(K), the second process cartridge 100(M), the third process cartridge 100(C) and the fourth process cartridge 100(Y). The side plates 222 may be arranged around the outside of the plurality of process cartridges and configured to limit the position of each process cartridge, such that each process cartridge may be stably installed on the moving part 220.

In some embodiments, a locking groove may be disposed on the side plate 222 for locking with each process cartridge. In such way, each process cartridge may be relatively fixed to the moving part 220, which may prevent each process cartridge from being deviated relative to the moving part 220.

Figure 2:
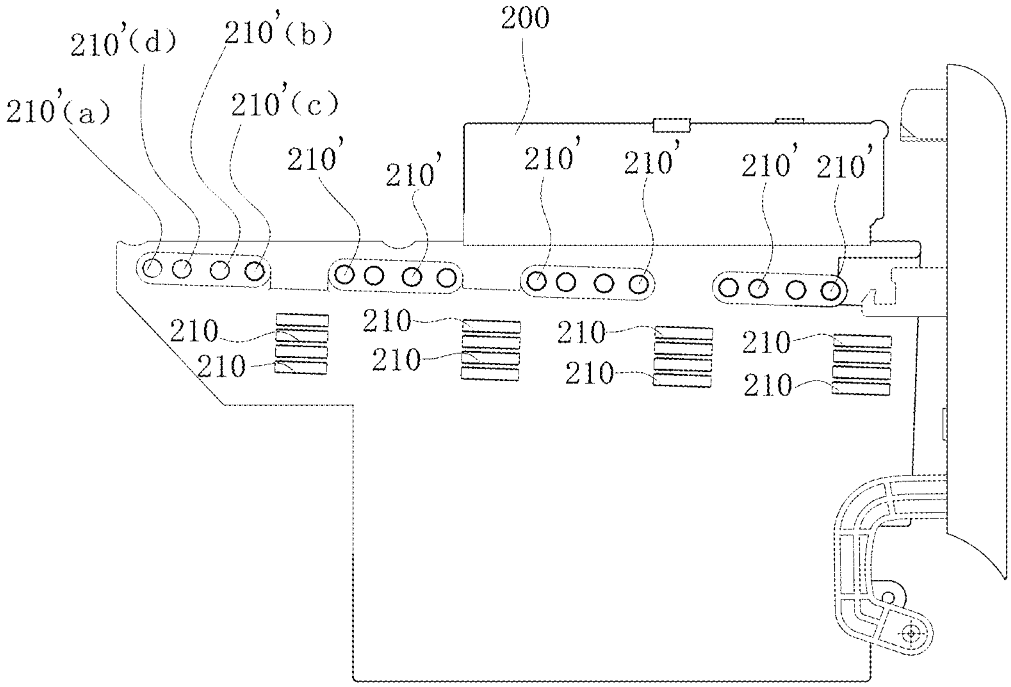
FIG. 2 illustrates a structural schematic of a main body in FIG. 1.

Referring to FIG. 2, the main body 200 may be disposed with the conductive terminals on the main-body side for applying voltage to one of the plurality of process cartridges. Specifically, the main body 200 may be disposed with the first conductive terminals 210 and the second conductive terminals 210'. The first conductive terminals 210 may be configured to be electrically connected to the storage apparatus of the process cartridge, and the second conductive terminals 210' may be configured to be electrically connected to the conductive part of the process cartridge, such that the image-forming member and external conductive part may be electrically connected to each other. The second conductive terminal 210' on the main-body side may be referred to external conductive part. It may be understood that the second conductive terminal 210' on the main-body side may be an electrical connection structure connected to the conductive part, and the contact position of the second conductive terminal 210' and the conductive part may not be limited. That is, according to different connection objects, the first conductive terminal 210 may be referred to a "low-voltage terminal", that is, the first conductive terminal 210 may be configured to provide low-voltage power to the storage apparatus, for example, provide 3.3V power to the storage apparatus; and the second conductive terminal 210' may be referred to a "high-voltage terminal", that is, the second conductive terminal 210' may be configured to provide high-voltage power to the image-forming member, such as provide +1200V voltage to the charging roller. For ease of explanation, the conductive contact on the storage apparatus connected to the first conductive terminal 210 may be referred to the first conductive contact, and the conductive contact on the process cartridge connected to the second conductive terminal 210' may be referred to the second conductive contact.

It should be noted that the second conductive terminal 210' disposed on the main body may be electrically connected to the conductive part of any one of the plurality of process cartridges. The image-forming member may be one of the photosensitive drum, the developing roller, and the charging roller. Therefore, the quantity of image-forming members powered by the conductive parts on the process cartridge may be one or more, and each image-forming member may be disposed with a corresponding conductive part.

Figure 3:
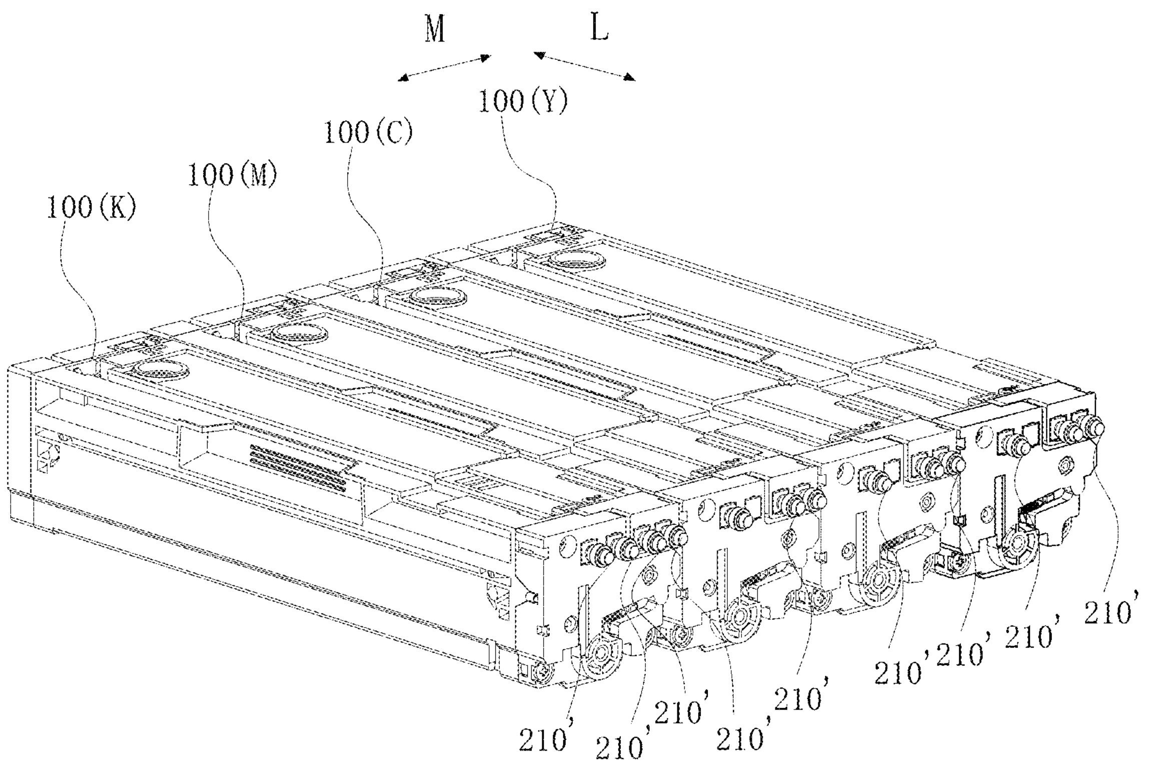
FIG. 3 illustrates a structural schematic of a plurality of process cartridges in parallel with each other provided by exemplary embodiments of the present disclosure.

Referring to FIG. 3, a process cartridge is further provided in one embodiment. The plurality of process cartridges may form a process cartridge set. The process cartridge set may be detachably installed in the main body 200 of the image-forming apparatus 10 to facilitate maintenance and replacement of each process cartridge.

Figure 4:
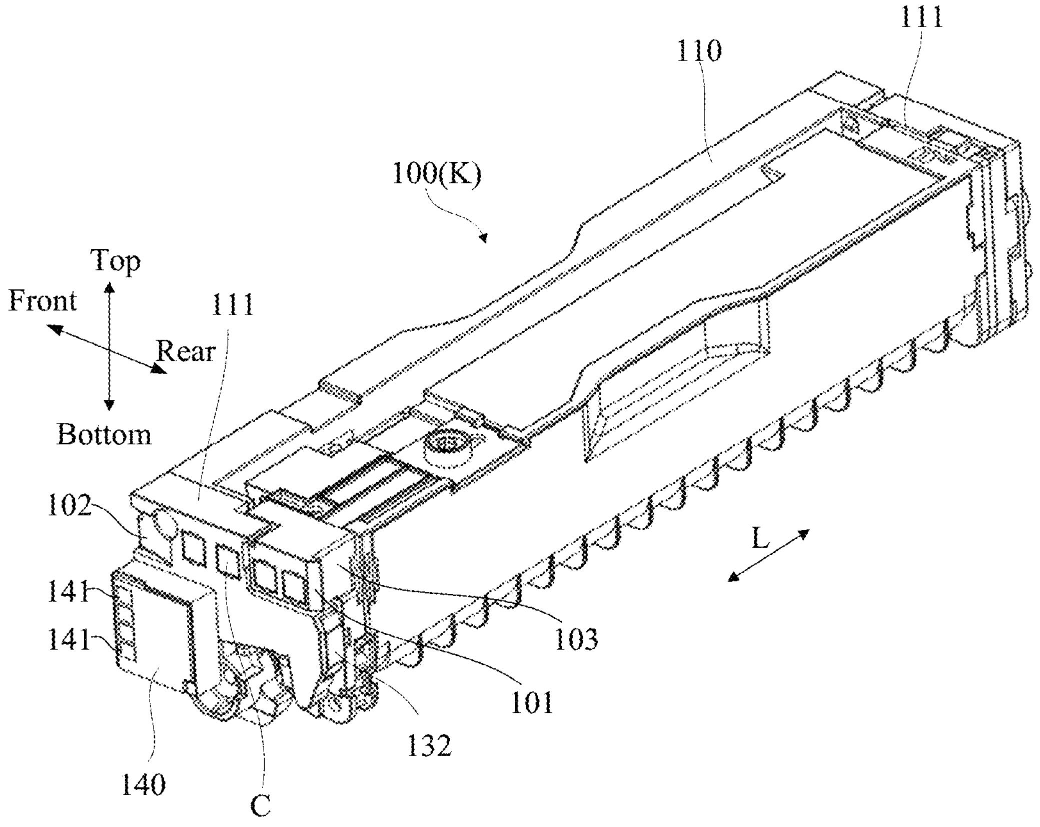
FIG. 4 illustrates a structural schematic of a single process cartridge in FIG. 3.
Figure 5:
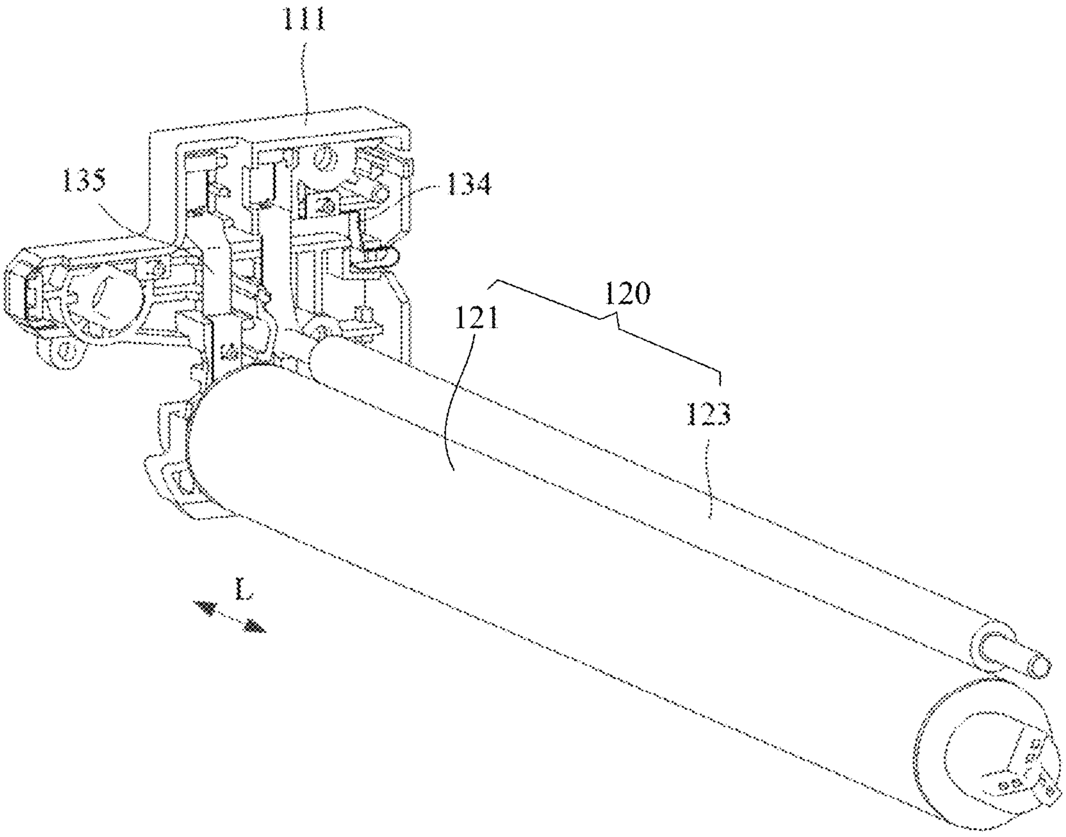
FIG. 5 illustrates a structural schematic of a photosensitive drum, a charging roller and a conductive part in a process cartridge in FIG. 4.

Referring to FIGS. 4-5, the process cartridge may include a housing 110 and an image-forming member 120. A developer accommodating chamber may be disposed in the housing 110 and configured to accommodate developer, where the housing 110 may be made of a plastic material with lightweight. The image-forming member 120 may be disposed at the housing 110. The image-forming member 120 may be, for example, a photosensitive drum 121, a developing roller 122 (shown in FIG. 10), a charging roller 123, a toner feeding roller (not shown), a toner adjustment element (not shown) for adjusting the amount of toner, and the like. The axes of the photosensitive drum 121, the developing roller 122, the charging roller 123 and the toner feeding roller may be in parallel with each other; and the photosensitive drum 121, the developing roller 122, the charging roller 123 and the toner feeding roller may be arranged along the length direction L of the process cartridge. It may be understood that the length direction L of the process cartridge may be the axis direction of the photosensitive drum 121.

Referring to FIG. 4, the housing 110 may include end covers 111. Two end covers 111 may be configured in the housing 110. Two end covers 111 may be respectively disposed at two ends of the process cartridge along the length direction L. The photosensitive drum 121, the developing roller 122, the charging roller 123 and the like may be all arranged and fixed between two end covers 111. The charging roller 123 may be configured to charge the photosensitive drum 121; the photosensitive drum 121 may be configured to form the electrostatic latent image; the toner feeding roller may transport the toner to the developing roller 122; the toner adjustment element may adjust the toner on the surface of the developing roller 122 to a preset amount and make the toner to be evenly charged; and the developing roller 122 may be configured to convert the electrostatic latent image on the photosensitive drum 121 into the toner image. Therefore, during operation of the image-forming apparatus 10, the voltages may need to be applied to the photosensitive drum 121, the developing roller 122, the charging roller 123, the toner feeding roller and the toner adjustment element.

It may be understood that a driving assembly may be disposed on one of two end covers 111, and the image-forming member 120 may be driven to rotate by the driving assembly; and the conductive part may be disposed on the other end cover 111. For example, the driving assembly may be disposed on one of two end covers 111 to drive the photosensitive drum 121 to rotate; and the conductive part may be disposed on the other end cover 111.

Figure 8:
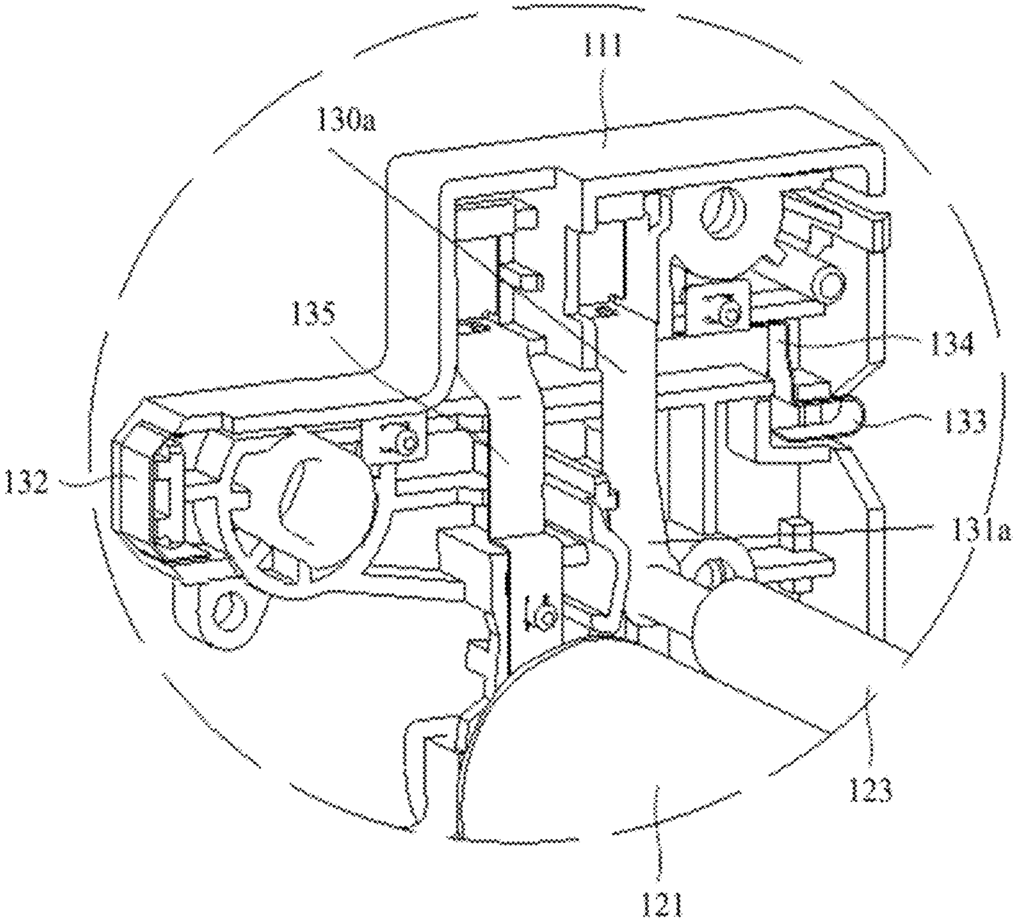
FIG. 8 illustrates a structural schematic of an end cover in FIG. 5.

The conductive part of the process cartridge and the end cover 111 may be connected by a locking manner (as shown in FIGS. 5 and 8); or the conductive part may be fixed on the end cover 111 through threaded fasteners, locking pins and the like (not shown).

Referring to FIG. 5, the end cover 111 may be approximately a plate-shaped structural member. Exemplarily, the end cover 111 may include a plate body and an enclosing portion; the plate body may be perpendicular to the axis of the image-forming member 120 and connected to the image-forming member 120; and the enclosing portion may protrude from the plate body toward one side of the image-forming member 120, such that the end cover 111 may form an accommodating region with an opening. The conductive part of the process cartridge may be connected to the plate body to form protection for the conductive part through the accommodating region. Furthermore, the end cover 111 may include an end surface and a side surface. The end surface may be understood as the end surface of the plate body and may be perpendicular to the axis of the image-forming member 120; the side surface may be understood as the outer wall surface of the enclosing portion; and the side surface may be connected to the end surface.

In some embodiments, the image-forming member 120 may be installed between two end surfaces, oppositely disposed, of the housing 110 along the length direction L of the process cartridge; that is, the image-forming member 120 may be disposed between two end covers 111.

In order to protect the photosensitive drum 121, the developing roller 122, the charging roller 123 and other parts, the plate body of the end cover 111 may have an irregular geometric shape. In such way, the end cover 111 may have multiple side surfaces connected end to end.

To facilitate applying voltage to each image-forming member, the process cartridge may further include the conductive part for supplying voltage to each image-forming member. In order to facilitate different descriptions, the conductive part electrically connected to the photosensitive drum 121 may be referred to the first conductive part, the conductive part electrically connected to the developing roller may be referred to the second conductive part, and the conductive part electrically connected to the charging roller 123 may be referred to the third conductive part. Since the structures of all conductive parts are basically same except for different connected image-forming members, only the first conductive part is taken as an example to describe the structure in detail hereinafter.

Figure 6:
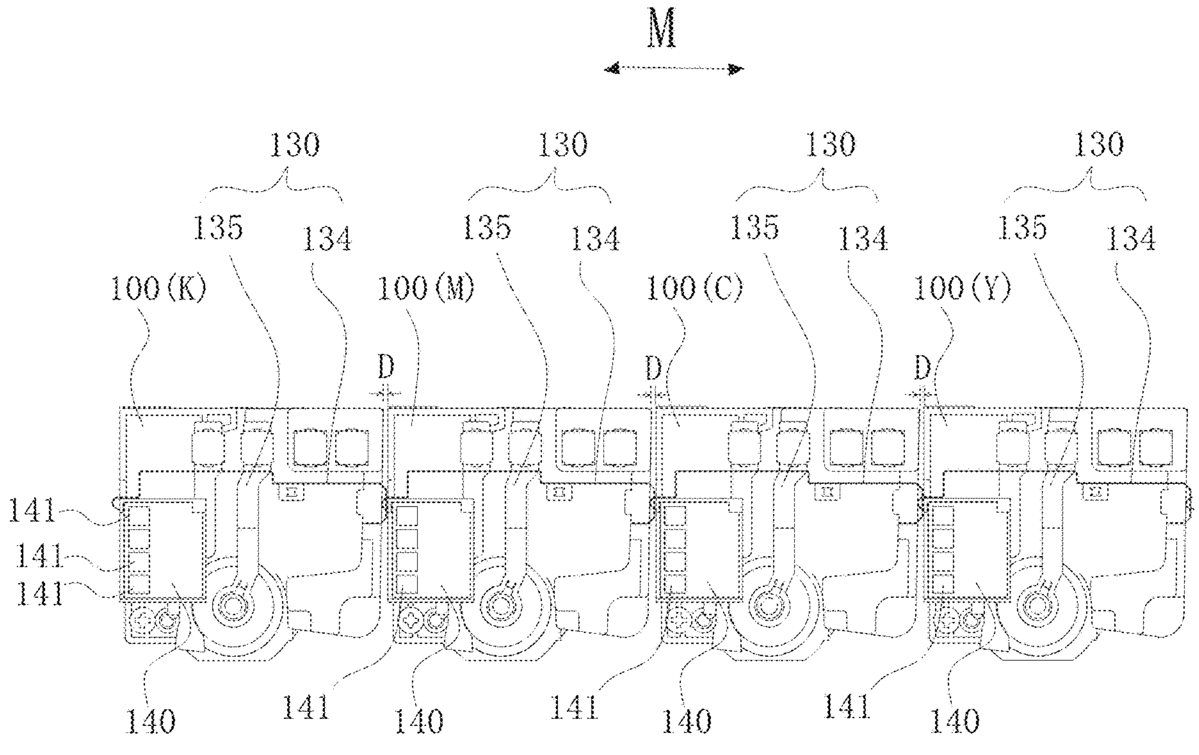
FIG. 6 illustrates a side view of a plurality of process cartridges provided by exemplary embodiments of the present disclosure.

Referring to FIG. 6, the process cartridge may also include the first conductive part 130; and the first conductive part 130 may be disposed on the housing 110; and the voltage may be supplied to the photosensitive drum 121 as the first image-forming member through the first conductive part 130. The first conductive part 130 may be a metal part, and the material of the metal part may be copper, gold, aluminum and the like.

In some embodiments, the photosensitive drum may include an aluminum base, a steel axle and a conductive bearing; the aluminum base may be disposed on the main body of the photosensitive drum; the steel axle may be disposed on the end portion of the main body of the photosensitive drum; and the aluminum base and steel axle may be electrically connected to each other. The first electrical output terminal 131 may include a hollow portion and a locking portion; the hollow portion may be sleeved on the outside of the steel axle; the conductive bearing may be disposed between the hollow portion and the steel axle; and the locking portion may be abutted against the conductive sleeve. Or the first electrical output terminal 131 may be in direct contact with the conductive bearing disposed on the steel axle.

Figure 7A:
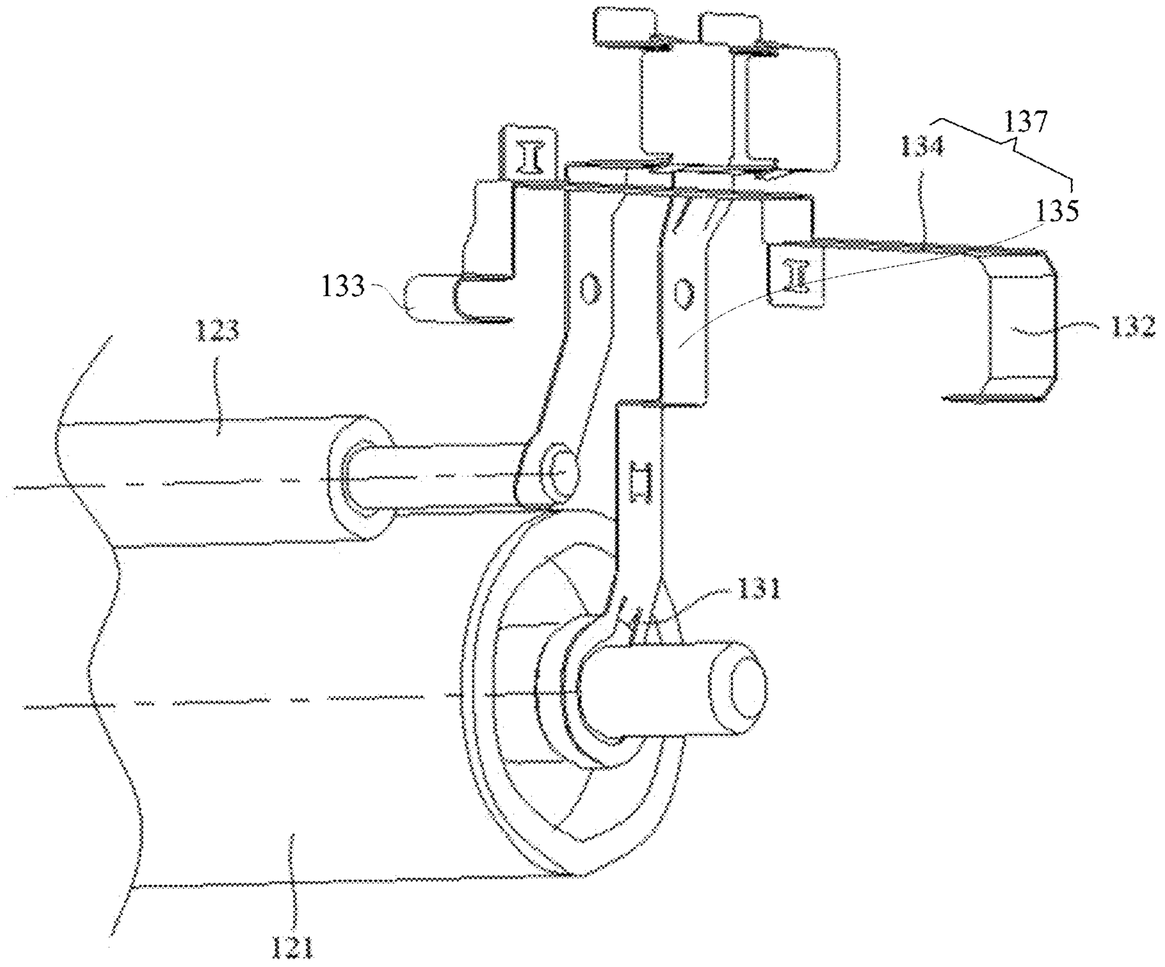
FIGS. 7A-7B illustrate structural schematics of a conductive part provided by exemplary embodiments of the present disclosure.
Figure 7B:
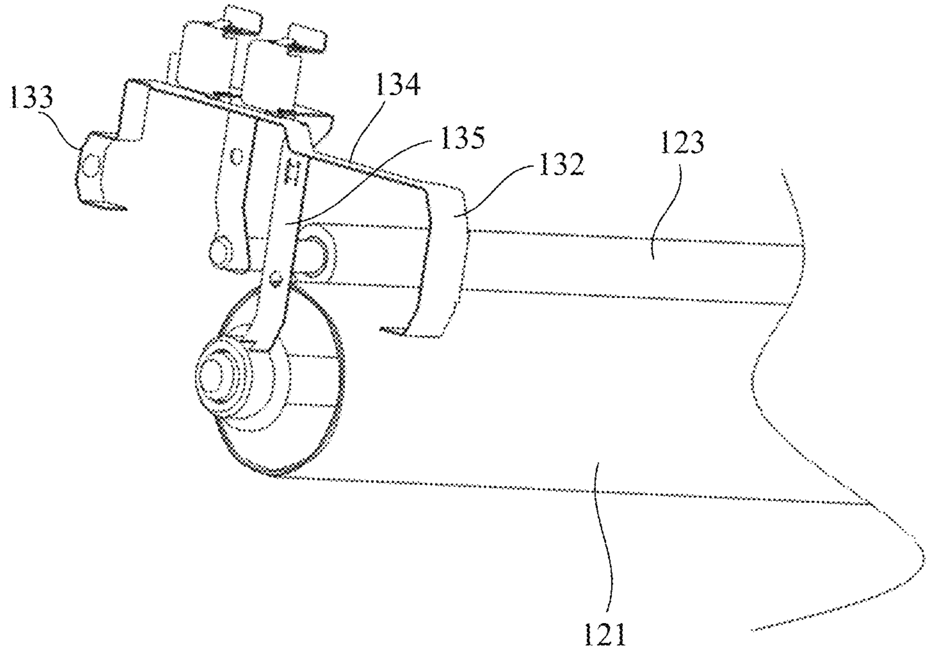

Referring to FIGS. 6, 7A and 7B, the first conductive part 130 may include the first electrical receiving portion 133, the first electrical output terminal 131, the first electrical conduction portion 132 and the first electrical transfer portion 137; and the first electrical transfer portion 137 may include the first conductive sheet 134 and the second conductive sheet 135 that are electrically connected to each other. Two ends of the first conductive sheet 134 may be electrically connected to the first electrical receiving portion 133 and the first electrical conduction portion 132 respectively, where the first electrical receiving portion 133 may be configured for connecting with an external conductive part to obtain power, and the first electrical conduction portion 132 may be configured for electrical connection between two adjacent process cartridges. One end of the second conductive sheet 135 may be connected to the first electrical output terminal 131, and the first electrical output terminal 131 may be configured to be electrically connected to the photosensitive drum 121 as the image-forming member. When the process cartridge is in conduction through the first conductive part 130, the first electrical receiving portion 133 may be electrically connected to the power outside current process cartridge to receive the first voltage from the outside of current process cartridge; the first electrical output terminal 131 may transfer the second voltage to the photosensitive drum 121 as the image-forming member; and the first electrical conduction portion 132 may output the third voltage to the outside of current process cartridge. Optionally, the first electrical conduction portion 132 may output the third voltage to other process cartridges adjacent to current process cartridge.

Specifically, at least a part of the first electrical receiving portion 133 and at least a part of the first electrical conduction portion 132 may be installed outside the housing of the process cartridge; and the first electrical transfer portion and the first electrical output terminal 131 may be disposed inside the housing of the process cartridge. The length of the first conductive sheet 134 may extend along the first direction, the length of the second conductive sheet 135 may extend along the second direction, and one end of the second conductive sheet 135 may be connected to the middle region of the first conductive sheet 134.

In some embodiments, exemplarily, when the first electrical receiving portion 133 is configured to be electrically connected to the second conductive terminal disposed on the main body of the image-forming apparatus to receive power transferred from the main body of the image-forming apparatus, the first electrical receiving portion 133 may be on the end surface of the end cover 111, the first electrical conduction portion 132 may be on the sidewall of the process cartridge, and the sidewall may be adjacent to the end cover 111. In one embodiment, the first electrical conduction portion 132 for transferring voltage may be disposed on the side surface of the process cartridge to facilitate direct electrical connection between two process cartridges without adding relay parts to save costs.

Furthermore, the first conductive part 130 may be configured as an irregular shape. The first electrical receiving portion 133 and the first electrical conduction portion 132 may extend along different directions. In order to facilitate the electrical connection of the first conductive parts 130 in two adjacent process cartridges, in some embodiments, the first electrical receiving portion 133 and the first electrical conduction portion 132 may pass through the enclosing portion of the end cover 111 and be exposed outside the enclosing portion. That is, the first electrical receiving portion 133 and the first electrical conduction portion 132 may be respectively on two opposite sidewalls of the process cartridges, and two different sidewalls may be respectively adjacent to the end surface of the end cover 111.

In some embodiments, the first conductive part 130 may further include a voltage adjustment unit; and the voltage transferred to the image-forming member may be adjusted through the voltage adjustment unit according to the voltage needed by the image-forming member in the process cartridge. Specifically, the process cartridge may receive the first voltage through the electrical receiving portion and supply the second voltage to the image-forming member through the electrical output portion; and the voltages of the first voltage and the second voltage may be same or different. When the voltages of the first voltage and the second voltage are different, the first conductive part may further include the voltage adjustment unit to achieve voltage conversion. The voltage adjustment unit may not only adjust the magnitude of the voltage, but also adjust the polarity of the voltage, as long as the image-forming member may obtain suitable power voltage. Specifically, the process cartridge may receive the first voltage through the electrical receiving portion and supply the third voltage to the outside of current process cartridge through the electrical conduction portion; and the voltages of the first voltage and the third voltage may be same or different. When the voltages of the first voltage and the third voltage are different, the first conductive part may further include the voltage adjustment unit to achieve voltage conversion. The voltage adjustment unit may not only adjust the magnitude of the voltage, but also adjust the polarity of the voltage, as long as current process cartridge may transfer an appropriate voltage to the outside.

It may be understood that, referring to FIG. 4, taking the process cartridge 100(K) as an example, at least one of the first electrical receiving portion 133 and the first electrical conduction portion 132 may also pass through the plate body of the end cover 111, thereby being exposed outside the end portion of the process cartridge.

It may be understood that when the first electrical receiving portion 133 is on the side surface of the end cover 111, the end surface of the first electrical receiving portion 133 may be coplanar with the side surface of the end cover 111 or may extend to the outside of the side surface of the end cover 111. When the first electrical conduction portion 132 is at the side surface of the end cover 111, the end surface of the first electrical conduction portion 132 may be coplanar with the side surface of the end cover 111 or may extend to the outside of the side surface of the end cover 111. The installation positions of the first electrical receiving portion 133 and the first electrical conduction portion 132 may not be limited in one embodiment.

The first conductive part 130 may be a sheet-like structural member; and the first electrical receiving portion 133, the first electrical conduction portion 132 and the first electrical output terminal 131 may all correspond to different positions of the first conductive part 130.

In some embodiments, the first conductive sheet 134 and the second conductive sheet 135 may be configured to be formed into a single piece or detachably connected to each other; the first electrical receiving portion 133, the first electrical conduction portion 132 and the first conductive sheet 134 may be configured to be formed into a single piece or detachably connected to each other; and the first electrical output terminal 131 and the second conductive sheet 135 may be configured to be formed into a single piece or detachably connected to each other.

In order to simplify the structure of the first conductive part 130, referring to FIGS. 7A and 7B, in some optional implementation manners, the first conductive sheet 134 and the second conductive sheet 135 may both be strip-shaped structural members. Two ends of the first conductive sheet 134 may be respectively configured as the first electrical receiving portion 133 and the first electrical conduction portion 132. The spacing direction of the first electrical receiving portion 133 and the first electrical conduction portion 132 (that is, the extending direction of the first conductive sheet 134) may be in parallel with the parallel direction M of the plurality of process cartridges, which may facilitate electrical connection between the first electrical receiving portion 133 and the first electrical conduction portion 132 of the first conductive part 130 in adjacent process cartridge. The first electrical output terminal 131 may be disposed on the second conductive sheet 135 and extend toward the axis side of the image-forming member 120 to be electrically connected to the roller axle of the image-forming member 120. When viewed from the length direction L of the process cartridge, the first conductive sheet 134 may intersect the second conductive sheet 135; that is, the first conductive sheet 134 and the second conductive sheet 135 may be overlapped with each other along the length direction L of the process cartridge.

In some embodiments, the first electrical conduction portion 132 may include an abutting plane which may be in parallel with the axis of image-forming member 120. In such way, the area at the abutting position between the first electrical receiving portion 133 and the first electrical conduction portion 132 of adjacent first conductive part 130 may be relatively large, which may avoid the case that two adjacent process cartridges cannot be effectively electrically connected to each other. The abutting plane may smoothly transition to the side surface of the end cover 111 or extend to the outside of the side surface of the end cover 111.

In some embodiments, the first electrical receiving portion 133 of the first conductive sheet 134 may have an arc-shaped structure. The arc-shaped structure may be elastic and effectively abutted against the abutting plane to avoid fake connection between two adjacent first conductive parts 130. Or the first electrical receiving portion 133 may include an elastic part which may be configured with protrusions.

Figure 9:
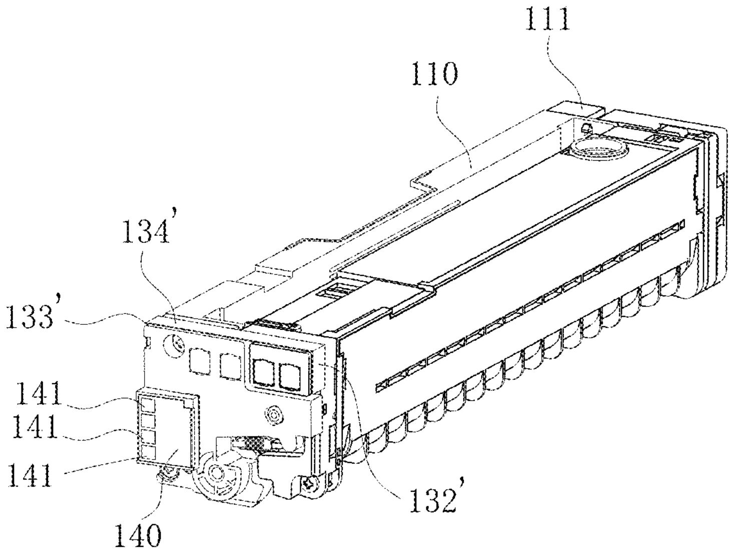
FIG. 9 illustrates a structural schematic of a conductive part disposed outside a process cartridge provided by exemplary embodiments of the present disclosure.

In some embodiments, as shown in FIG. 9, the first conductive part 130 may include a metal-wrapped sheet 134', and the metal-wrapped sheet 134' may be disposed outside the housing 110 of the process cartridge. That is, the first conductive sheet may be configured as a metal-wrapped structure, such that the conductive contact between adjacent process cartridges may be through the conductive surface of the metal-wrapped sheet 134'. That also is, the first electrical receiving portion 133' and the first electrical conduction portion 132' may both be planes to be in parallel with the axis of the image-forming member 120. The area at the abutting position between the first electrical conduction portion 132' and the first electrical receiving portion 133' of the metal-wrapped sheet 134' of adjacent process cartridge may be relatively large, which may avoid the case that two adjacent process cartridges cannot be effectively electrically connected to each other.

In some embodiments, when the plurality of process cartridges are electrically connected, a fitting gap D may be between two adjacent process cartridges. Therefore, in order to achieve effective electrical connection between two adjacent process cartridges, the first electrical receiving portion 133 and the first electrical conduction portion 132 may both extend to the outside of the end cover 111 along the parallel direction M of the process cartridges (as shown in FIG. 6).

Figure 10:
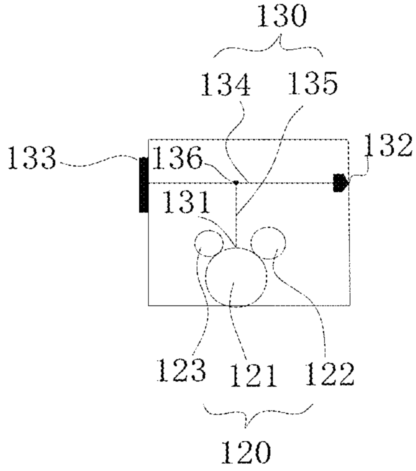
FIG. 10 illustrates a principle schematic of electrical connection of a process cartridge provided by exemplary embodiments of the present disclosure.

Referring to FIG. 10, for the second conductive sheet 135, the first electrical output terminal 131 may be electrically connected to one end of the second conductive sheet 135, and the other end of the second conductive sheet 135 may be electrically connected to a connection end 136. That is, the connection end 136 may be disposed between the first conductive sheet 134 and the second conductive sheet 135 for electrical connection. The connection end 136 may be directly connected to the first conductive sheet 134, for example, by welding, locking or the like. At this point, the connection end 136 may be connected to any position of the first conductive sheet 134. For example, the connection end 136 may be fixedly connected to the middle region of the first conductive sheet 134.

Referring to FIG. 11, in the plurality of process cartridges that are electrically connected to each other, each process cartridge may be electrically connected through the first electrical receiving portion 133 and the first electrical conduction portion 132 respectively.

Figure 12:
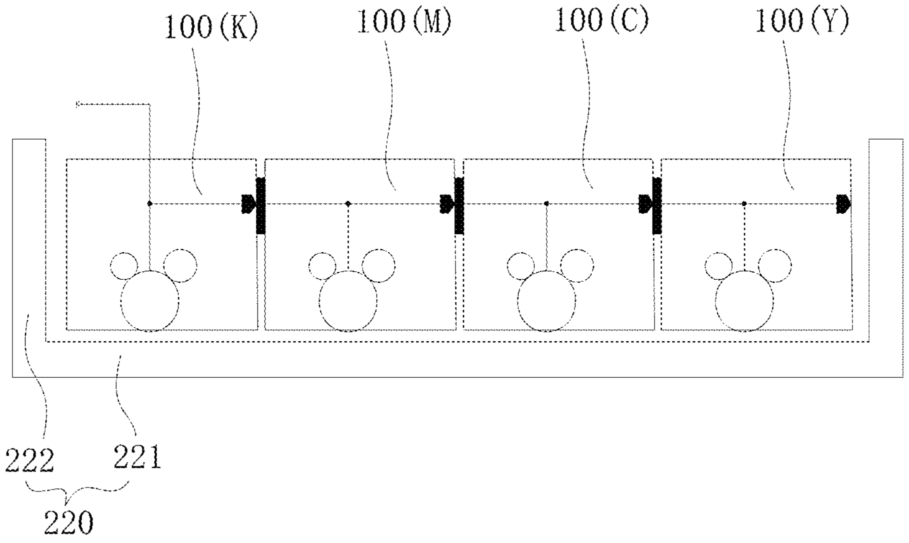
FIG. 12 illustrates another principle schematic of electrical connection of a plurality of process cartridges in FIG. 10.

In some embodiments, as shown in FIG. 12, in the plurality of process cartridges that are electrically connected to each other, the first electrical receiving portion corresponding to the first process cartridge 100 (K) may not need to pass through the plate body, such that the first electrical receiving portion may not need to be exposed outside the end portion of the process cartridge.

When the process cartridge is installed in the image-forming apparatus 10, the process cartridge may receive the power voltage provided by the power supply unit through the first electrical receiving portion 133 of the first conductive sheet 134. For example, the power supply unit may be disposed on the main body 200 of the image-forming apparatus 10, or on the process cartridge, or on the moving part 220 of the image-forming apparatus 10 for accommodating the plurality of process cartridges, or on other process cartridges electrically connected to such process cartridge, which may not be limited herein. In addition, the power supply unit may be a battery, a power circuit or the like. The form of the power supply unit may not be limited in embodiments of the present disclosure, as long as the power supply unit may provide the power voltage.

For example, when the first process cartridge 100(K), the second process cartridge 100(M), the third process cartridge 100(C), and the fourth process cartridge 100(Y) are installed in the image-forming apparatus 10, the first process cartridge 100(K) may receive the power voltage provided by the power supply unit through the first electrical receiving portion 133 and transfer the voltage to above-mentioned other process cartridges through the first electrical conduction portion 132.

External conductive part may be configured to be electrically connected to above power supply unit and the first conductive part 130. Specifically, external conductive part may be configured to be electrically connected to above power supply unit and the first electrical receiving portion 133. For example, when the power supply unit is disposed on the main body of the image-forming apparatus 10, external conductive part may include the conductive terminal (not shown in drawings) disposed on the main body 200 of the image-forming apparatus 10; and the conductive terminal may be electrically connected to the first conductive part 130 on the process cartridge. Or, when the power supply unit is disposed on the moving part 220 of the image-forming apparatus 10, external conductive part may include the conductive terminal disposed on the moving part 220 of the image-forming apparatus 10; and the conductive terminal may be electrically connected to the first conductive part 130 on the process cartridge. Or, when the power supply unit is disposed on another process cartridge electrically connected to the process cartridge, external conductive part may include the conductive terminal disposed on another process cartridge electrically connected to the process cartridge; and the conductive terminal may be electrically connected to the first conductive part 130 on the process cartridge. Furthermore, the conductive terminal disposed on another process cartridge may be the first electrical conduction portion 132 of the first conductive part 130 disposed on another process cartridge. Or external conductive part may also refer to a sheet metal member disposed on the main body 200 of the image-forming apparatus 10. At this point, the sheet metal part may be in a grounded state and electrically connected to the first conductive part 130 on the process cartridge. External conductive parts may be in the form of the conductive terminal and the sheet metal part mentioned above, or other conductive parts (e.g., connectors) configured to connect the power supply unit and the first connection end. Herein, the form of external conductive part may not be limited in embodiments of the present disclosure, as long as the first conductive part 130 may be electrically connected to the power supply unit.

In some embodiments, external conductive part may be electrically connected to the first electrical receiving portion 133 directly; and external conductive part may also be electrically connected to other parts of the first conductive part 130 directly, thereby electrically connected to the first electrical receiving portion 133 indirectly, which may not be limited in embodiments of the present disclosure.

Exemplarily, when the quantity of the image-forming members 120 powered by the conductive parts on the process cartridge is one, the image-forming member 120 may be any one of the photosensitive drum 121, the developing roller 122 and the charging roller 123. At this point, taking the photosensitive drum 121 disposed with conductive parts as an example, the process cartridge may be disposed with a set of conductive parts, that is, the first conductive parts 130. When the quantity of image-forming members 120 powered by conductive parts on the process cartridge is three, the image-forming members 120 may be the photosensitive drum 121, the developing roller 122 and the charging roller 123. Taking the photosensitive drum 121 and the developing roller 122 respectively disposed with conductive parts as an example, at this point, each process cartridge may be disposed with the first conductive part 130 and the second conductive part. The first electrical output terminal 131 of the first conductive part 130 may be electrically connected to the photosensitive drum 121; the second electrical output portion of the second conductive part 130 may be electrically connected to the developing roller 122; at least a portion of the first conductive parts 130 and at least a portion of the second conductive parts may be arranged to be staggered to each other; and the first conductive part 130 and the second conductive part may be insulated from each other.

It may be further explained that along the length extension direction of the process cartridge, that is, along the axial direction of the photosensitive drum, at least a portion of the first conductive parts 130 and a part of the second conductive part may be arranged to be staggered with each other; and the first conductive part 130 and the second conductive part may be insulated from each other.

In some embodiments, the process cartridge may also be disposed with the first conductive part 130, the third conductive part 130*a* and the second conductive part (not shown in drawings). The first conductive part 130, the third conductive part 130*a* and the second conductive part may be configured to respectively supply power to the photosensitive drum 121, the charging roller 123 and the developing roller 122; and the first conductive part 130, the third conductive part 130*a* and the second conductive part may be insulated from each other. It may be understood that the paths configured by the first conductive part 130, the third conductive part 130*a* and the second conductive part on the process cartridge may bypass each other to avoid contact for forming electrical short circuit and damaging the process cartridge. That is, at least a portion of the first conductive part 130, at least a portion of the third conductive part 130*a*, and at least a portion of the second conductive part may be arranged to be staggered with each other. It may be further explained that along the length extension direction of the process cartridge, that is, along the axial direction of the photosensitive drum, at least a portion of the first conductive part 130, at least a portion of the second conductive part, and at least a portion of the third conductive part 130*a* may be arranged to be staggered with each other; and the first conductive part 130, the second conductive part, and the third conductive part 130*a* may be insulated from each other.

Obviously, when the process cartridge is disposed with components such as a toner feeding roller (not shown), a toner discharge knife (not shown) and the like, and when the toner feeding roller and the toner discharge knife also need power, more conductive parts may be installed in the process cartridge. Moreover, the paths disposed on the process cartridge between the conductive parts may bypass each other, and the conductive parts may be insulated from each other.

Furthermore, in embodiments of the present disclosure, the power parts in the process cartridge configured to provide voltage to each image-forming member may also be different. For example, the conductive part electrically connected to the photosensitive drum may have same structure as the first conductive part 130 in above-mentioned embodiments; and the structures of the parts electrically connected to other image-forming members such as the charging roller and the developing roller in the process cartridge to provide voltage may be different from the structure of the first conductive part 130. That is, not all image-forming members in the process cartridge may need to use the conductive parts provided in embodiments of the present disclosure to obtain power; and at least a part of the image-forming members may still obtain power by being electrically connected to the second conductive terminal disposed on the main body of the image-forming apparatus. For convenience of description, the power-supply part corresponding to the image-forming member that obtains power by being electrically connected to the second conductive terminal disposed on the main body of the image-forming apparatus may be referred to a conductive member. The conductive member may include an electrical input terminal and an electrical output terminal, where the electrical input terminal and the electrical output terminal may be electrically connected to each other. The electrical output terminal may be electrically connected to the image-forming members such as the charging roller and the developing roller; and the electrical input terminal may be configured to be electrically connected to the second conductive terminal disposed on the main body of the image-forming apparatus to obtain power. That is, for the convenience of distinction, the terminal on the first conductive part 130 connected to the end portion of the image-forming member may be referred to the "electrical output portion", and the terminal on the conductive element that is structurally different from the first conductive part 130 and connected to the end portion of the image-forming member may be referred to the "electrical output terminal".

In an optional implementation manner, the process cartridge may include the first conductive part 130 for supplying power to the photosensitive drum 121 and the conductive element (not shown) for supplying power to at least one of other image-forming members such as the charging roller 123, the developing roller 122, the toner feeding roller (not shown), the toner knife (not shown) and the like. It may be understood that at least a portion of the first conductive part 130 and at least a portion of the conductive element (not shown) may be arranged to be staggered with each other to avoid contact for forming electrical short circuit and damaging the process cartridge. It may be further explained that along the length extension direction of the process cartridge, that is, along the axial direction of the photosensitive drum, at least a portion of the first conductive part 130 and at least a portion of the conductive element may be arranged to be staggered with each other; and the first conductive part 130 and the conductive element may be insulated from each other.

In some embodiments, referring to FIG. 3, the plurality of process cartridges may be arranged along the direction perpendicular to the axis of the image-forming member 120 (the M direction in FIG. 3), and among the plurality of process cartridges, two adjacent process cartridges may be electrically connected to each other. Specifically, when the image-forming member 120 is the photosensitive drum 121, the first electrical receiving portion 133 of the first conductive part 130 of one of two adjacent process cartridges may be electrically connected to the first electrical conduction portion 132 of the first conductive part 130 of another process cartridge, such that the electrical connection between the process cartridges may be achieved through the first electrical receiving portion 133 and the first electrical conduction portion 132. At this point, in two adjacent process cartridges, the first conductive part 130 of one process cartridge may form external conductive part of the other process cartridge. Two first conductive parts 130 that are electrically connected to each other in the plurality of process cartridges may be connected by welding, locking or other manners.

In some embodiments, two first conductive parts 130 that are electrically connected to each other in the plurality of process cartridges may also be connected by an abutting manner to facilitate removal and installation of the process cartridges.

The plurality of process cartridges may be electrically connected through the first conductive parts 130. Therefore, when the first conductive part 130 corresponding to one of the plurality of process cartridges that are electrically connected to each other is electrically connected to the power supply unit, the plurality of first conductive parts 130 may all obtain same potential, such that the plurality of same image-forming members 120 (for example, the plurality of photosensitive drums 121) may obtain voltage. At this point, when the power supply unit for supplying power to the image-forming member 120 is disposed in the main body of the image-forming apparatus 200, corresponding to same image-forming members 120 in the plurality of process cartridges (for example, the plurality of photosensitive drums 121 mentioned above), the main body 200 may be disposed with the second conductive terminal 210' for applying voltage to one of the plurality of process cartridges. That is, corresponding to multiple same image-forming members 120 in the plurality of process cartridges, the main body 200 may be disposed with only one second conductive terminal 210'. The second conductive terminal 210' on the main-body side may be electrically connected to the first conductive part 130 of any one of the plurality of process cartridges.

That is, the main body 200 may be disposed with only one second conductive terminal 210'; and through the first conductive parts 130, same image-forming members 120 (e.g., above-mentioned plurality of photosensitive drums 121) in the plurality of process cartridges may all obtain voltage, which may reduce the quantity of second conductive terminals 210' corresponding to the plurality of same image-forming members 120 (e.g., the plurality of photosensitive drums 121 mentioned above) on the main body 200. Therefore, the elastic force between the main body 200 and the process cartridges may be reduced, thereby reducing costs and simplifying the spatial structure of the image-forming apparatus 10.

The second conductive terminal 210' disposed on the main body 200 may correspond to any process cartridge. In some embodiments, when multiple sets of conductive parts are disposed on the process cartridge corresponding to the plurality of image-forming members 120 (e.g., at least two of the photosensitive drum 121, the charging roller 123, and the developing roller mentioned above), the main body 200 may be disposed with the plurality of second conductive terminals 210'. The plurality of second conductive terminals 210' may respectively correspond to different process cartridges, which may prevent the electrical connection structures on the main body 200 from being concentrated at a position corresponding to a certain process cartridge, thereby simplifying the spatial structure of the image-forming apparatus 10 and reducing costs.

Exemplarily, the second conductive terminal 210' on the main body 200 corresponding to the photosensitive drum 121 may be electrically connected to the first conductive part 130, the second conductive terminal 210' corresponding to the charging roller 123 may be electrically connected to the third conductive part **130*a*, and the second conductive terminal 210' corresponding to the developing roller 122** may be electrically connected to the second conductive part (not shown).

Exemplarily, the second conductive terminal 210' corresponding to the photosensitive drum 121 on the main body 200 may be electrically connected to the first process cartridge, the second conductive terminal 210' corresponding to the developing roller 122 may be electrically connected to the second process cartridge, and the second conductive terminal 210' corresponding to the charging roller 123 may be electrically connected to the third process cartridge.

Referring to FIG. 4, the end cover 111 disposed with the first conductive part 130 may be also disposed with a storage apparatus 140. The storage apparatus 140 may be configured to record attribute information (such as a serial number, toner color information) and consumption information (such as a remaining amount of toner of the process cartridge). The storage apparatus 140 may include a circuit board, a memory disposed on the circuit board, and a plurality of first conductive contacts 141 electrically connected to the memory. The connection direction of the plurality of first conductive contacts 141 may be perpendicular to the moving direction of the moving part 220 (i.e., the parallel direction M of the process cartridges); and the storage apparatus 140 may be on the end surface of the process cartridge disposed with the first conductive part 130 and adjacent to the front side of the housing. Referring to FIG. 6, the storage apparatus 140 may be closer to the lower bottom surface of the process cartridge relative to the first conductive sheet 134 of the conductive part. Furthermore, the storage apparatus 140 may be closer to the lower bottom surface of the process cartridge relative to a conductive endpoint C (the conductive endpoint C may be an endpoint of the conductive part used for electrical connection with the power supply unit) of the conductive part; and the developer accommodating chamber may be on the rear side of the housing of the process cartridge. The storage apparatus 140 may be closer to the front side of the housing of the process cartridge compared to the rear side of the housing of the process cartridge, as shown in FIG. 4. In such way, it ensures that when the process cartridge is installed in the image-forming apparatus, the storage apparatus 140 may be further away from the plurality of second conductive contacts disposed on the process cartridge for receiving high voltage, which may prevent that the second conductive terminal 210' on the main-body side of the image-forming apparatus is in contact with the first conductive contact 141 on the storage apparatus 140 to cause high voltage to damage the first conductive contact 141. In addition, space may be effectively avoided, which may prevent the problem that the second conductive terminal 210' disposed on the main body with high voltage is in contact with the bracket used to install the storage apparatus to cause the interference between the bracket and the second conductive terminal 210' disposed on the main body when the process cartridge is installed.

Furthermore, the storage apparatus 140 may include the plurality of first conductive contacts 141. The plurality of first conductive contacts 141 may be arranged along the direction perpendicular to the M direction. When the process cartridge is installed in the image-forming apparatus 10, same conductive contact 141 may be prevented from being scraped by the plurality of first conductive terminals 210 disposed on the main body 200 which may scrape small pieces of the first conductive contact 141 to result in the wear of the first conductive contact 141 and further result in abnormal communication between the storage apparatus 140 and the main body to affect the printing quality. Meanwhile, it is also beneficial for arranging relative positions of the first conductive terminal 210 and the second conductive terminal 210' on the main body of the image-forming apparatus 200. If the arrangement directions of the first conductive terminals 210 and the second conductive terminals 210' are in parallel with each other, a relatively large reserve space at the high-voltage side provided by the image-forming apparatus may be needed with high costs.

Figure 13:
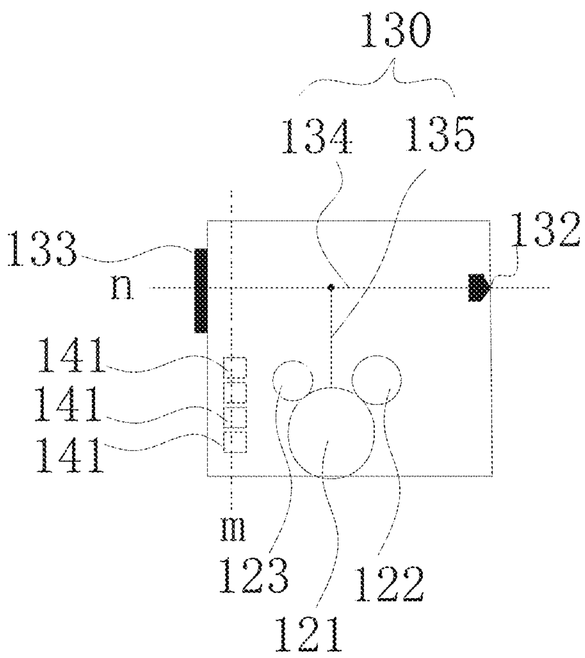
FIG. 13 illustrates a relative position schematic of a first conductive part and a connection line of conductive contacts of the storage apparatus provided by exemplary embodiments of the present disclosure.

Specifically, when the process cartridge is installed in the image-forming apparatus 10, the plurality of first conductive contacts 141 may be electrically connected to the first conductive terminals 210 on the side of the main body 200 of the image-forming apparatus 10. Furthermore, when viewed from the length direction L of the process cartridge, the first conductive contact 141 and the first conductive part 130 may be not in same plane. Referring to FIG. 13, along the length L direction of the process cartridge, the projection of the extension line m of the connection line of at least two first conductive contacts among the plurality of first conductive contacts 141 may intersect (preferably vertically) the connection line n of the first electrical receiving portion 133 and the first electrical conduction portion 132 of the first conductive part 130. That is, on the end surface of the process cartridge, the second conductive contact (the high-voltage contact) may be closer to the top of the housing of the process cartridge, and the plurality of first conductive contacts 141 may be closer to the bottom of the housing of the process cartridge; and the first conductive part may be between the second conductive contact and the memory apparatus 140. Such configuration may simplify the spatial structure of the image-forming apparatus 10, and also effectively prevent the problem that the first conductive contact 141 is in contact with the second conductive terminal 210' disposed on the main body of the image-forming apparatus during the installation process of the process cartridge to cause high voltage to damage the first conductive contact 141 on the storage apparatus. In addition, debris scraped off by the first conductive terminal 210 of the main body of the process cartridge may also be prevented from sticking to the first conductive contact 141, thereby preventing communication abnormality in the storage apparatus. At this point, the connection line n between the first electrical receiving portion 133 and the first electrical conduction portion 132 may be specifically understood as the connection line of a point included in the first electrical receiving portion 133 and a point included in the first electrical conduction portion 132. Furthermore, the connection line may be in parallel with the M direction.

In some embodiments, along the length L direction of the process cartridge, the projection of the extension line m of the connection line of at least two first conductive contacts among the plurality of first conductive contacts 141 may intersect the connection line n of the first electrical receiving portion 133 and the first electrical conduction portion 132 of the first conductive part 130, which may specifically refer to that along the length L direction of the process cartridge, in the plurality of first conductive contacts 141, the projection of the extension line m of the connection line of a point included in at least one first conductive contact and a point included in another first conductive contact may intersect the connection line n of the first electrical receiving portion 133 and the first electrical conduction portion 132 of the first conductive part 130. Specifically, when the plurality of first conductive contacts 141 included in the storage apparatus 140 are regular conductive surfaces with a certain size, the connection line of at least two first conductive contacts 141 among the plurality of first conductive contacts 141 of the storage apparatus 140 may exemplarily be the connection line of the center points of at least two first conductive contacts among the plurality of first conductive contacts 141.

Figure 14:
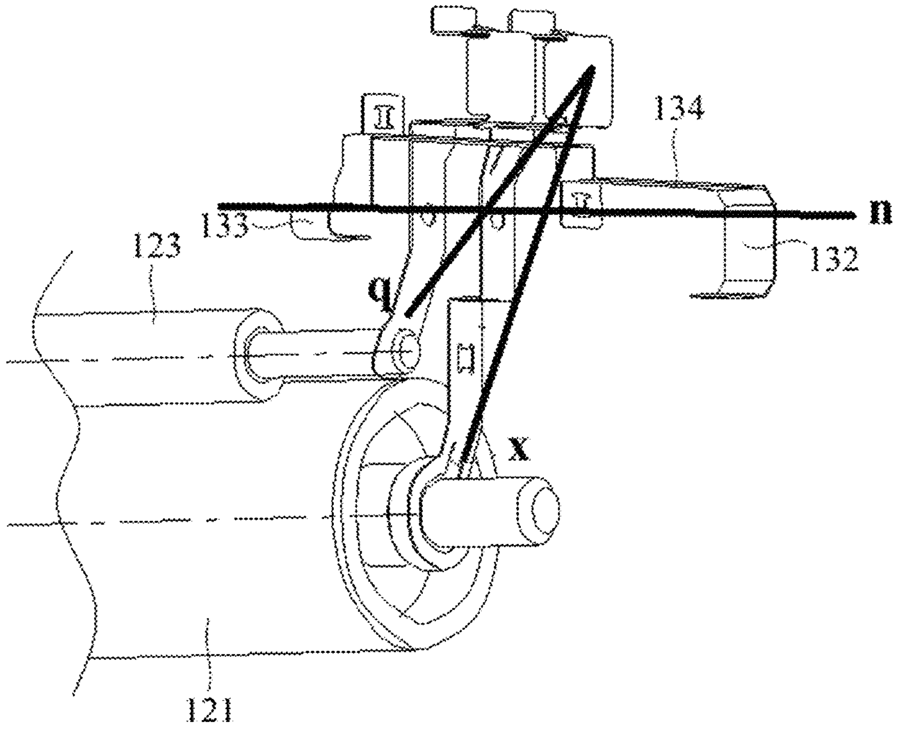
FIG. 14 illustrates a relative position schematic of a connection line of a first conductive part and connection lines between second conductive terminals on a main-body side of an image-forming apparatus and output terminals of a first image-forming member and a second image-forming member respectively provided by exemplary embodiments of the present disclosure.

In other embodiments, referring to FIG. 14, when the process cartridge is installed in the image-forming apparatus 10 and viewed from the length direction L of the process cartridge, the projection of the connection line x between the second conductive terminal 210', which is on the main-body side of the image-forming apparatus 10, and the first electrical output terminal 131 of the first conductive part 130 may intersect the projection of the connection line n between the first electrical receiving portion 133 and the first electrical conduction portion 132; and the projection of the connection line q between the second conductive terminal 210' and the third electrical output terminal **131*a* of the third conductive part 130*a* may intersect the projection of the connection line n between the first electrical receiving portion 133 and the first electrical conduction portion 132. The connection line of the second conductive terminal 210' and the first electrical output terminal 131 may be a connection line of any point on the second conductive terminal 210' and any point included in the first electrical output terminal 131; and the connection line of the second conductive terminal 210' and the third electrical output terminal 131*a* may be a connection line of any point on the second conductive terminal 210' and any point included in the third electrical output terminal 131*a*. It should be noted that the second image-forming member may also be the developing roller 122, which may not be limited in the present disclosure. The structure of the third conductive part 130*a* may be same as the structure of the first conductive part 130. Obviously, the third conductive part 130*a* may also be replaced with another above-mentioned conductive member different from the first conductive part 130. The conductive member may include an electrical input terminal and an electrical output terminal. The electrical output terminal may be electrically connected to the end portion of another image-forming member. The electrical input terminal may be configured to be electrically connected to the second conductive terminal 210' disposed on the main body of the image-forming apparatus to receive the power transferred by the main body of the image-forming apparatus. When the process cartridge is installed in the image-forming apparatus, the projection of the connection line of the second conductive terminal 210' and the electrical output terminal of the conductive element may intersect the projection of the connection line of the first electrical receiving portion 133 and the first electrical conduction portion 132 of the first conductive part 130; and the projection of the connection line of the second conductive terminal 210' and the first electrical output terminal 131 of the first conductive part 130 may intersect the projection of the connection line of the first electrical receiving portion 133 and the first electrical conduction portion 132 of the first conductive part 130**. With such configuration, the second conductive contact (the high-voltage contact) disposed on the process cartridge and the end portion of the image-forming member may be on different sides of the conductive part, which may effectively avoid the problem of a relatively large image-forming apparatus caused by arranging the high-voltage contact and the end portion of the image-forming member on same side of the conductive part, thereby being beneficial for the miniaturization design of the image-forming apparatus.

Referring to FIG. 4, in one embodiment, the first avoidance portion 101 may be formed at the first edge of the end surface of the process cartridge; the second avoidance portion 102 may be formed at the second edge of the end surface of the process cartridge; the third avoidance portion 103 may be formed at the edge of the sidewall of the process cartridge; and an inclined surface may be also disposed on the end surface of the process cartridge, where the first avoidance portion and the third avoidance portion may be arranged to be adjacent to each other. It may be understood that in other embodiments, the first avoidance portion may be formed at the first edge of the end surface of the process cartridge, or the second avoidance portion may be formed at the second edge of the end surface of the process cartridge, or the third avoidance portion may be formed at the edge of the sidewall of the process cartridge; or the avoidance portions may be formed at any two of the first edge, the second edge and the third edge.

After four process cartridges are installed in the moving part 220, during the process of the process cartridges being pushed in or pulled out of the main body of the image-forming apparatus along with the moving part 220, the high-voltage contacts on the main-body side of the image-forming apparatus may slide on the process cartridges. Since the gaps are between the process cartridges, the high-voltage contacts may be easily stuck in the gaps between the process cartridges. In one embodiment, the first avoidance portion 101, the second avoidance portion 102 and the inclined surface are provided, such that the high-voltage contacts may be guided through the first avoidance portion 101, the second avoidance portion 102 and the inclined surface, which may further prevent the high-voltage contacts from being stuck in the gaps between the process cartridges.

When the process cartridges are installed in the moving part 220, the first electrical receiving portion 133 of a latter process cartridge (the end of the first conductive sheet protruding from the end surface of the process cartridge) may need to be in contact with the first electrical conduction portion 132 of a previous process cartridge, the third avoidance portion 103 may be formed on one side of the process cartridge in one embodiment. When the process cartridge is installed in the moving part 220, the first electrical receiving portion 133 may be avoided by the third avoidance portion 103. Therefore, the third avoidance portion 103 may prevent the process cartridge from being unable to be installed in the moving part 220 due to the protrusion of the first electrical receiving portion 133.

Figure 15:
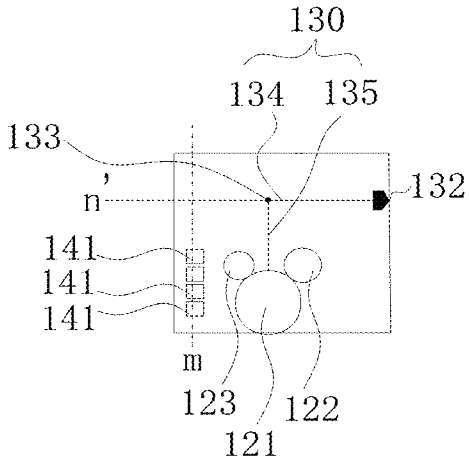
FIG. 15 illustrates another relative position schematic of a first conductive part and a connection line of conductive contacts of the storage apparatus provided by exemplary embodiments of the present disclosure.

Based on above-mentioned embodiments, the present disclosure further discloses another specific implementation manner. Referring to FIG. 15, in one embodiment, the first electrical receiving portion may be on above-mentioned end surface (not shown), the first electrical conduction portion 132 may be on the sidewall of the process cartridge, and the sidewall may be adjacent to the end surface. Therefore, the process cartridge may be connected to the power supply unit through the first voltage receiving portion on the end surface to obtain power. Specifically, when the process cartridge 100 is directly connected to the main body of the image-forming apparatus through the first voltage receiving portion to obtain power, referring to FIG. 4, the first electrical receiving portion may be the conductive terminal C, which may not be limited herein. For the convenience of subsequent explanation, the second conductive terminal directly electrically connected to the first electrical receiving portion may be referred to the second conductive terminal 210'(d); and the other second conductive terminals disposed on the main body of the image-forming apparatus may be referred to second conductive terminals 210'(a), 210'(b) and 210'(c) (as shown in FIG. 2).

In some embodiments, the end surface of the process cartridge disposed with the first electrical receiving portion may be also disposed with a plurality of second conductive contacts; the plurality of second conductive contacts may be electrically connected to the developing roller, the toner feeding roller, and the charging roller in the process cartridge respectively; and the plurality of second conductive contacts may be configured to be electrically connected to the plurality of second conductive terminals 210' on the side of the main body of the image-forming apparatus to receive power which is transferred by the main body of the image-forming apparatus.

In some embodiments, the storage apparatus 140 may be further disposed on the end surface of the process cartridge which is disposed with the first electrical receiving portion, and the storage apparatus 140 may include the plurality of first conductive contacts 141.

Referring to FIG. 15, along the length L direction of the process cartridge, the projection of the extension line m of the connection line of at least two first conductive contacts among the plurality of first conductive contacts 141 may intersect (preferably vertical) the projection of the extension line n' of the connection line of the first electrical receiving portion 133 and the first electrical conduction portion 132 of the first conductive part 130. That is, on the end surface of the process cartridge, the second conductive contacts (the high-voltage contacts) may be closer to the top of the housing of the process cartridge, the plurality of first conductive contacts 141 may be closer to the bottom of the housing of the process cartridge, and the first conductive part may be between the second conductive contacts and the memory apparatus 140. Such configuration may, on the one hand, simplify the spatial structure of the image-forming apparatus 10, and on the other hand, also effectively prevent the problem that during the installation process of the process cartridge, the first conductive contact 141 may be in contact with the second conductive terminal 210' disposed on the main body of the image-forming apparatus to cause high voltage to damage the first conductive contact 141 on the storage apparatus. In addition, such configuration may also prevent communication abnormality of the storage apparatus due to that debris scraped off by the process cartridge from the first conductive terminal 210 of the main body is attached to the first conductive contact 141. At this point, the extension line n' of the connection line of the first electrical receiving portion 133 and the first electrical conduction portion 132 may be specifically understood as an extension line of the connection line of a point included in the first electrical receiving portion 133 and a point included in the first electrical conduction portion 132.

Figure 16A:
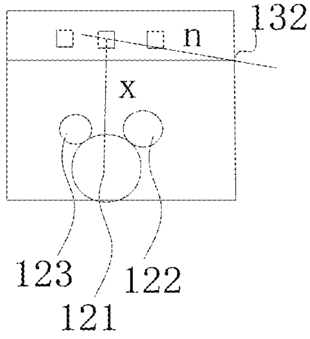
FIGS. 16A-16B illustrate relative position schematics of a connection line of a first conductive part and connection lines between second conductive terminals on a main-body side of an image-forming apparatus and output terminals of a first image-forming member and a second image-forming member respectively provided by exemplary embodiments of the present disclosure.

In some embodiments, referring to FIG. 16A, the first electrical receiving portion 133 may be configured to be electrically connected to the second conductive terminal 210'(d) disposed on the main body of the image-forming apparatus to receive power transferred by the main body of the image-forming apparatus. When the process cartridge is installed in the image-forming apparatus 10 and viewed along the length direction L of the process cartridge, the projection of the connection line X between the second conductive terminal 210'(d) and the first electrical output terminal 131 may intersect the projection of the connection line n between the first electrical receiving portion 133 and the first electrical conduction portion 132.

Figure 16B:
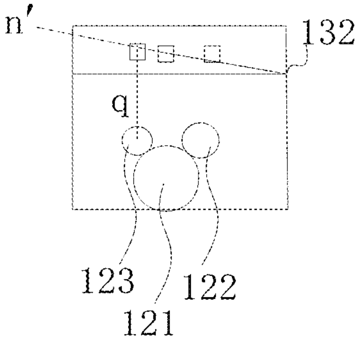

In some optional embodiments, referring to FIG. 16B, the main body of the image-forming apparatus 10 may be disposed with the second conductive terminal 210'(d), the second conductive terminal 210'(a), and the second conductive terminal 210'(b) and the second conductive terminal 210'(c). The process cartridge may be also disposed with the conductive element a, the conductive element b and the conductive element c that are mentioned above and different from the first conductive part 130; and the process cartridge may be also disposed with image-forming members such as the charging roller 123, the photosensitive drum 121, the developing roller 122 and the like. The conductive element a may be electrically connected to the charging roller 123, the conductive element b may be electrically connected to the developing roller 122, the conductive element c may be electrically connected to the toner feeding roller (not shown), and the first conductive part 130 may be electrically connected to the photosensitive drum 121. The electrical input terminal of the conductive element a may be configured to be connected to the second conductive terminal 210'(a) disposed on the main body of the image-forming apparatus; the electrical input terminal of the conductive element b may be configured to be connected to the second conductive terminal 210'(b) disposed on the main body of the image-forming apparatus; and the electrical input terminal of the conductive element c may be configured to be connected to the second conductive terminal 210'(c) disposed on the main body of the image-forming apparatus.

When the process cartridge is installed in the image-forming apparatus 10 and viewed along the length direction L of the process cartridge, the projection of the connection line q between the second conductive terminal 210'(a) of the main body of the image-forming apparatus 10 and the electrical output terminal of the conductive element a of the charging roller 123 may intersect the projection of the extension line n' of the connection line of the first electrical receiving portion 133 and the first electrical conduction portion 132 of the first conductive part 130.

Furthermore, when the process cartridge is installed in the image-forming apparatus 10 and viewed along the length direction L of the process cartridge, lines intersecting the projection of the connection line of the first electrical receiving portion 133 and the first electrical conduction portion 132 of the first conductive part 130 may also include the following scenarios:

1) the connection line of the second conductive terminal 210'(b) and at least one of the following terminals including the electrical output terminal of the conductive element b, the electrical output terminal of the conductive element c, and the electrical output portion of the first conductive part 130; and 2) the connection line of the second conductive terminal 210'(c) and at least one of the following terminals including the electrical output terminal of the conductive element a, the electrical output terminal of the conductive element b, the electrical output terminal of the conductive element c, and the electrical output portion of the first conductive part 130.

Furthermore, when the process cartridge is installed in the image-forming apparatus 10 and viewed along the length direction L of the process cartridge, the projection of the extension line of the connection line of the second conductive terminal 210'(a) and the electrical output terminal of the conductive element a may intersect the projection of the extension line of the connection line of the first electrical receiving portion 133 and the first electrical conduction portion 132 of the first conductive part 130.

With such configuration, the second conductive contact (the high-voltage contact) disposed on the process cartridge and the end portion of the image-forming member may be on different sides of the conductive part, which may effectively avoid the problem of a relatively large image-forming apparatus caused by arranging the high-voltage contact and the end portion of the image-forming member on same side of the conductive part, thereby being beneficial for the miniaturization design of the image-forming apparatus.

Figure 17:
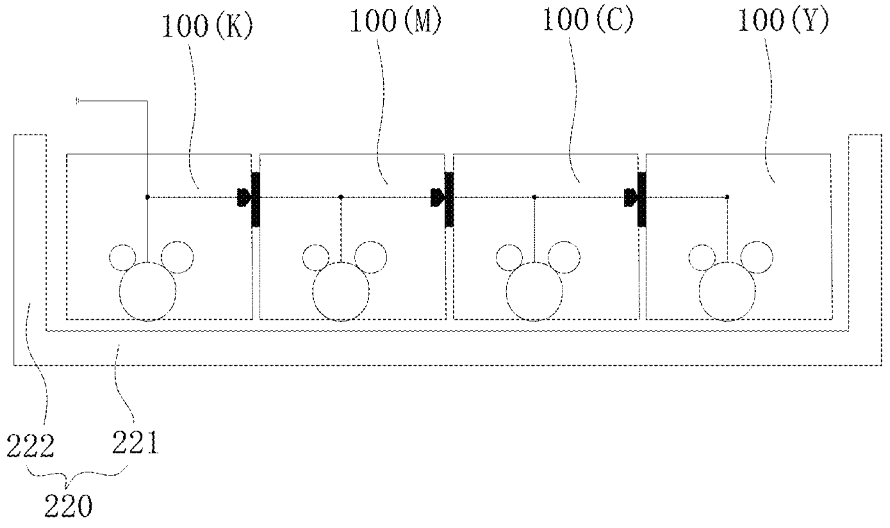
FIG. 17 illustrates another principle schematic of electrical connection of a plurality of process cartridges in FIG. 10.

In some possible embodiments, referring to FIG. 17, in the plurality of process cartridges that are electrically connected to each other, the first electrical conduction portion corresponding to the fourth process cartridge 100 (Y) may not need to pass through the plate body, such that the first electrical conduction portion corresponding to the fourth process cartridge 100 (Y) may not need to be exposed outside the end portion of the process cartridge. It may be understood that for the fourth process cartridge 100 (Y), there is no need to transfer power to other process cartridges. Therefore, for the fourth process cartridge 100 (Y), the first electrical conduction portion may not need to be exposed outside the end portion of the process cartridge.

In some embodiments, the first conductive sheet 134 and the second conductive sheet 135 may be disposed separately or may be formed into a single piece.

Figure 18:
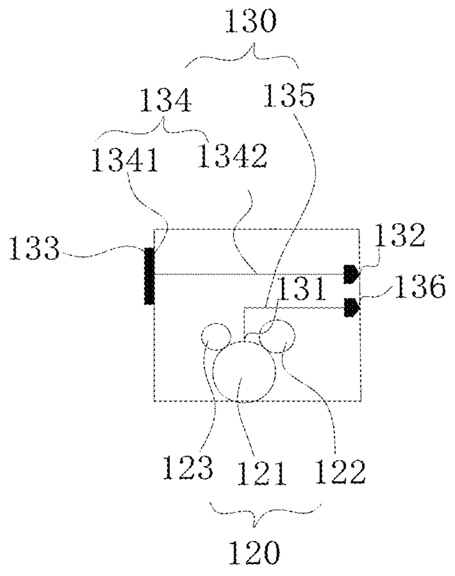
FIG. 18 illustrates another principle schematic of electrical connection of a process cartridge provided by exemplary embodiments of the present disclosure.

In some embodiments, as shown in FIG. 18, the first conductive sheet 134 and the second conductive sheet 135 may also be two independent components. Any one of the first electrical receiving portion 133 and the first electrical conduction portion 132 may be spaced apart from the connection end 136. For example, the first electrical conduction portion 132 and the connection end 136 may be arranged in parallel and outside the housing of the process cartridge. When the plurality of process cartridges is installed in the image-forming apparatus and two adjacent process cartridges are electrically connected to each other, the first electrical conduction portion 132 and the connection end 136 of one process cartridge may be simultaneously electrically connected to the first electrical receiving portion 133 of another process cartridge. In order to facilitate the first electrical conduction portion 132 and the connection end 136 to be electrically connected to the first electrical receiving portion 133 simultaneously, in some embodiments, the first conductive sheet 134 may include the first section 1341 and the second section 1342; an angle may be between the first section 1341 and the second section 1342; the first electrical receiving portion 133 may be connected to one end of the first section 1341 away from the second section 1342; and the first electrical conduction portion 132 may be connected to one end of the second section 1342 away from the first section 1341. The first section 1341 may extend toward the side of the second conductive sheet 135; and the extension length of the first section 1341 along the spacing direction between the first electrical conduction portion 132 and the connection end 136 may be greater than the spacing (separation) distance between the first electrical conduction portion 132 and the connection end 136. In such way, when the plurality of process cartridges is arranged in parallel, the first electrical conduction portion 132 and the connection end 136 of one of the process cartridges may be in contact with the first section 1341 of another process cartridge at same time, such that two adjacent process cartridges may be effectively electrically connected to each other. That is, one end of the second conductive sheet 135 may be disposed outside the housing of the process cartridge, which may be configured to electrically connect one end of the second conductive sheet 135 to the electrical conduction portion of the first conductive sheet 134 when current process cartridge is electrically connected to other process cartridges, thereby receiving the power transferred from the electrical conduction portion to the inside of current process cartridge; and the other end of the second conductive sheet may be connected to the electrical output portion, where such electrical output portion may be electrically connected to the end portion of the image-forming member.

It may be understood that the first section 1341 may also designed to be an independent connecting conductive part. The connecting conductive part may be connected to the first electrical receiving portion 133, and an included angle may be between the connecting conductive part and the first conductive sheet 134. In such way, when the plurality of process cartridges is arranged in parallel, the first electrical conduction portion 132 and the connection end 136 may be in contact with the connecting conductive part simultaneously.

In some embodiments, when the plurality of process cartridges is arranged in parallel on the main body 200 and the first conductive sheet 134 and the second conductive sheet 135 are two independent components, the first electrical conduction portion 132 and the connection end 136 of the fourth process cartridge 100 (Y) at the edge (refer to the process cartridge on the right side in FIGS. 19 and 20) may be still in a disconnected state.

Correspondingly, the main body 200 may be further disposed with one connecting conductive part for connecting the first electrical conduction portion 132 to the connection end 136 of the process cartridge at the edge.

In some embodiments, when the process cartridge is electrically connected to the second conductive terminal 210' on the main-body side, the second conductive terminal 210' on the main-body side may be electrically connected to any one of the first conductive sheet 134 and the second conductive sheet 135. Exemplarily, when the connection end 136 is fixedly connected to the first conductive sheet 134, the second conductive terminal 210' on the main-body side may be connected at the position of the connection end 136 (refer to FIG. 10). When the first conductive sheet 134 and the second conductive sheet 135 are independent of each other, the second conductive terminal 210' on the main-body side may be connected to the first conductive sheet 134 (refer to FIG. 19) or the second conductive sheet 135 (refer to FIG. 20).

Figure 20:
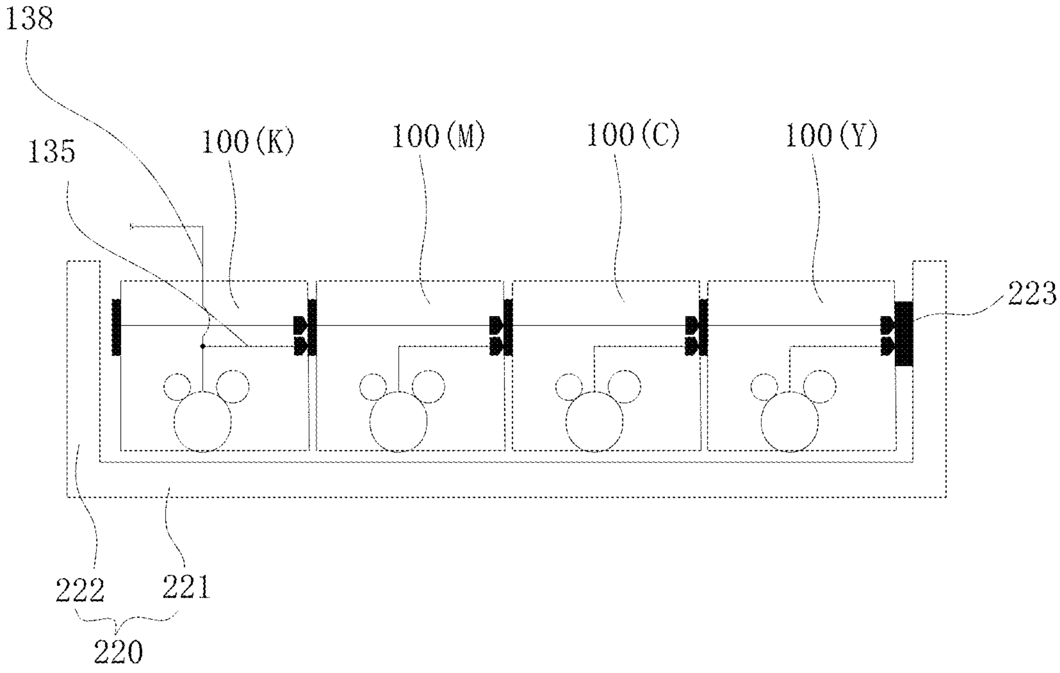
FIG. 20 illustrates another principle schematic of electrical connection of a plurality of process cartridges in FIG. 18.
Figure 21:
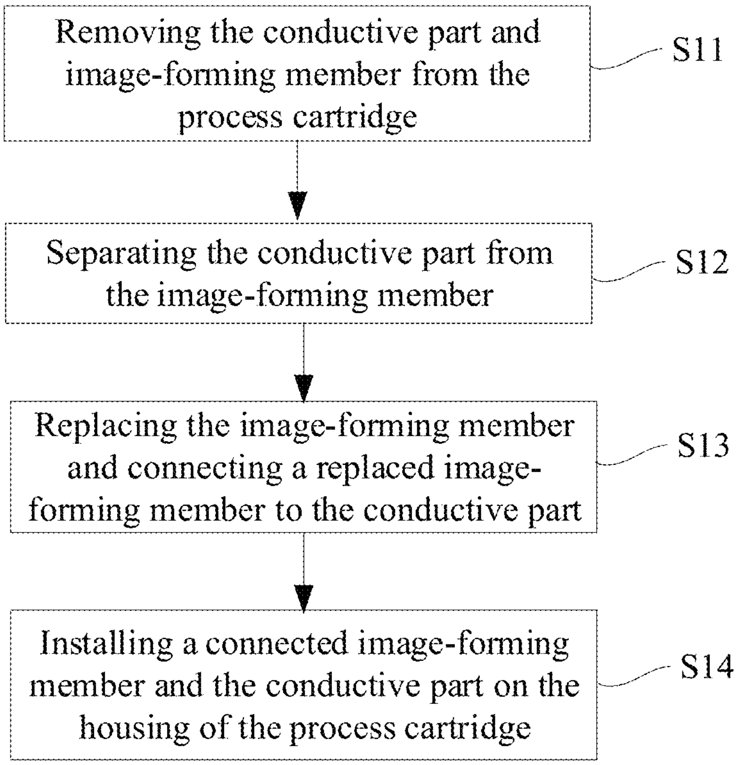
FIG. 21 illustrates a flowchart of a process cartridge recycling method provided by exemplary embodiments of the present disclosure.

Furthermore, referring to FIG. 20, the electrical transfer portion may include the first conductive sheet 134, the second conductive sheet 135, and the third conductive sheet 138. The end of the first conductive sheet 134 may be connected to the electrical conduction portion; one end of the second conductive sheet 135 may be disposed outside the housing of the process cartridge for being electrically connected to the electrical conduction portion, and the other end of the second conductive sheet 135 may be connected to the electrical output portion; and the first end portion of the third conductive sheet 138 may be connected to the electrical receiving portion, and the second end portion of the third conductive sheet 138 may be connected to the second conductive sheet 135.

Figure 19:
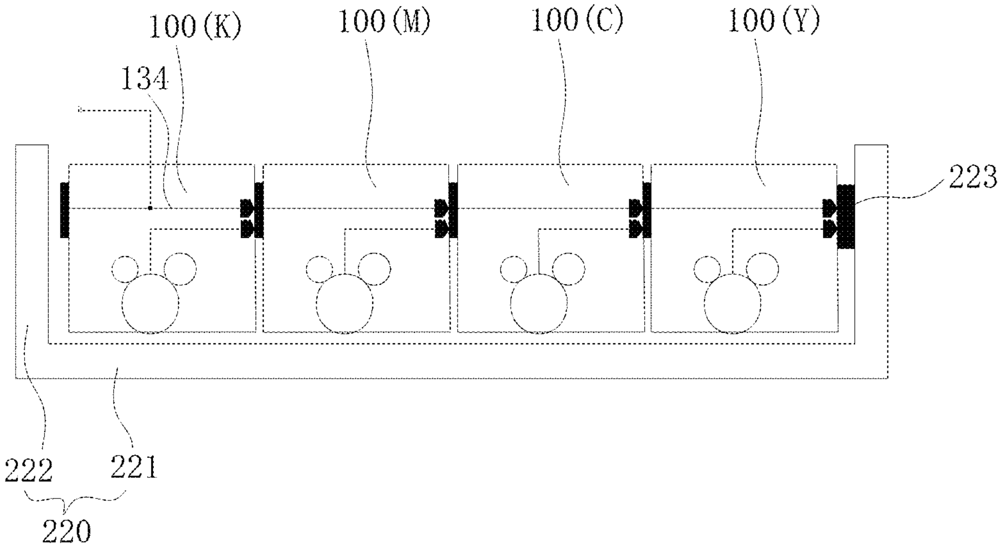
FIG. 19 illustrates a principle schematic of electrical connection of a plurality of process cartridges in FIG. 18.

Obviously, as shown in FIG. 19, the second end portion of the third conductive sheet 138 may also be connected to the first conductive sheet 134.

In some embodiments, the moving part 220 of the image-forming apparatus may be disposed with a conductive connecting part 223. The conductive connector 223 may be above-mentioned connecting conductive part. That is, when all process cartridges are installed on the moving part 220, the first electrical conduction portion 132 of the first process cartridge 100 (K) at the edge may be electrically connected to the first electrical output terminal 131 through the conductive connecting part 223, such that the plurality of image-forming members 120 may obtain voltage.

Based on above-mentioned embodiments, the present disclosure also discloses an image-forming assembly, applied to the process cartridge. The image-forming assembly may include the image-forming member and the conductive part in above-mentioned embodiments, and the electrical output portion of the conductive part may be electrically connected to the image-forming member.

A process cartridge set may include the process cartridges provided in above-mentioned embodiments. Based on above-mentioned embodiments, the present disclosure also discloses a process cartridge set. The process cartridge set may include the first process cartridge and the second process cartridge. The first process cartridge may include the first image-forming member and the first conductive part. The first conductive part may be electrically connected to the first image-forming member, such that the first image-forming member may be conductive through the first conductive part. The second process cartridge may include the second image-forming member and the second conductive part. The second conductive part may be electrically connected to the second image-forming member, such that the second image-forming member may be conductive through the second conductive part. The structures and functions of the first conductive part and the second conductive part may be substantially same as those of the conductive parts described in above-mentioned embodiments. The first image-forming member and the second image-forming member may be same or different, which may not be limited herein.

Specifically, the first conductive part may include the first electrical receiving portion, the first electrical transfer portion, the first electrical output portion and the first electrical conduction portion; and the first electrical transfer portion may be electrically connected to the first electrical receiving portion, the first electrical output portion and the first electrical conduction portion, respectively. The second conductive part may include the second electrical receiving portion, the second electrical transfer portion, and the second electrical output portion; and the second electrical transfer portion may be electrically connected to the second electrical receiving portion and the second electrical output portion, respectively. The first electrical receiving portion may be configured to be electrically connected to the second conductive terminal 210' on the main-body side of the image-forming apparatus, the first electrical output portion may be electrically connected to the first image-forming member, the first electrical conduction portion may be configured to be electrically connected to the second electrical receiving portion, and the second electrical output portion may be electrically connected with the second image-forming member. The first electrical conduction portion may be electrically connected to the second electrical receiving portion directly or may be electrically connected to the second electrical receiving portion indirectly through other conductive elements.

Furthermore, the plurality of second process cartridges may be disposed; the first process cartridges and the second process cartridges may be arranged in a row; in each second process cartridge, the second electrical receiving portion of the second conductive part corresponding to the second process cartridge adjacent to the first process cartridge may be electrically connected to the first electrical conduction portion of the first conductive part corresponding to the first process cartridge directly; and the second electrical receiving portion of the second conductive part corresponding to the second process cartridge away from the first process cartridge may be electrically connected to the first electrical conduction portion of the first conductive part corresponding to the first process cartridge indirectly.

Specifically, when the voltage received by the electrical receiving portion in the first process cartridge cannot meet the power requirement of the first image-forming member, the first process cartridge may further include a voltage adjustment element. Therefore, the voltage received by the electrical receiving portion may be adjusted to meet the power requirement of the first image-forming member. Similarly, the second process cartridge may also include a voltage adjustment element. That is, the process cartridge set may also include the voltage adjustment element. The voltage adjustment element may be disposed on each of the first conductive part and the second conductive part, which may be configured to adjust the voltage input to the first image-forming member and the second image-forming member according to the voltages needed by the first image-forming member in the first process cartridge and the second image-forming member in the second process cartridge. It may be understood that in other embodiments, the voltage adjustment element may also be disposed only on the first conductive part or the second conductive part, which may be configured to adjust the voltage input to the first image-forming member or the second image-forming member according to the voltage needed by the first image-forming member or the second image-forming member.

Based on above-mentioned embodiments, the present disclosure also discloses a recycling method of a process cartridge. The process cartridge may be the process cartridge in above-mentioned embodiments. The recycling method may include following exemplary steps.

At S11, the conductive part and the image-forming member may be removed from the process cartridge.

Specifically, the installation portion of the process cartridge may be opened, and the conductive part and the image-forming member may be removed.

At S12, the conductive part may be separated from the image-forming member.

At S13, the image-forming member may be replaced, and replaced image-forming member may be connected to the conductive part.

At S14, the connected image-forming member and the conductive part may be installed onto the housing of the process cartridge. In one embodiment, the conductive part and the image-forming member may be configured to be detachably connected to each other. When the image-forming member of the process cartridge fails, the faulty image-forming member may be removed and replaced with a new image-forming member. In such way, the process cartridge may be recycled for usage, which may saves costs and also be environmentally friendly.

Above-mentioned description may merely be optional embodiments of the present disclosure, which may not limit the protection scope of the present disclosure. Changes or substitutions which may be easily thought by those skilled in the art within the technical scope disclosed by the present disclosure should be covered by the protection scope of the present disclosure. Therefore, the protection scope of the present disclosure shall be subject to the protection scope of the claims.

What is claimed is:

1. A conductive part, configured to be installed in a process cartridge, the conductive part comprising:

an electrical receiving portion;

an electrical output portion;

an electrical conduction portion; and an electrical transfer portion, electrically connected to the electrical receiving portion, the electrical output portion and an electrical conduction portion respectively; and configured to transfer power received by the electrical receiving portion to the electrical output portion and the electrical conduction portion, wherein:

when the conductive part is configured to conduct electricity to the process cartridge, the electrical receiving portion is electrically connected to a power supply at an outside of the process cartridge to receive a first voltage from the outside of the process cartridge; and the electrical output portion is electrically connected to an image-forming member in the process cartridge and transfers a second voltage to the image-forming member; and the electrical conduction portion outputs a third voltage to the outside of the process cartridge.

2. The conductive part according to claim 1, wherein:

at least a part of the electrical receiving portion or at least a part of the electrical conduction portion is positioned at an outside of a housing of the process cartridge; or the electrical transfer portion or the electrical output portion is positioned at an inside of the housing of the process cartridge.

3. The conductive part according to claim 1, wherein:

the electrical transfer portion includes a first conductive sheet and a second conductive sheet; along a length extension direction of the first conductive sheet, a first end portion of the first conductive sheet is connected to the electrical receiving portion, and a second end portion of the first conductive sheet is connected to the electrical conduction portion, wherein the first conductive sheet extends along a first direction; and along a length extension direction of the second conductive sheet, an end of the second conductive sheet is connected to the first conductive sheet, and another end of the second conductive sheet is connected to the electrical output portion, wherein the second conductive sheet extends along a second direction, and the first direction intersects the second direction; or a first end portion of the first conductive sheet is connected to the electrical receiving portion, and a second end portion of the first conductive sheet is connected to the electrical conduction portion; an end of the second conductive sheet is configured to be disposed at the outside of the housing of the process cartridge and electrically connected to the electrical conduction portion; and another end of the second conductive sheet is connected to the electrical output portion.

4. The conductive part according to claim 1, wherein:

the electrical transfer portion includes a first conductive sheet, a second conductive sheet and a third conductive sheet; and the first conductive sheet is configured to be connected to the electrical conduction portion;

the second conductive sheet is configured to be connected to the electrical conduction portion and the electrical output portion; and the third conductive sheet is configured to be connected to the electrical receiving portion the second conductive sheet or the first conductive sheet.

5. The conductive part according to claim 1, wherein:

the electrical output portion includes a hollow portion and a locking portion.

6. The conductive part according to claim 1, wherein:

the electrical receiving portion includes an elastic part, the elastic part is disposed with a protrusion; and/or the electrical conduction portion includes an abutting plane.

7. The conductive part according to claim 1, wherein:

the image-forming member includes a first image-forming member and a second image-forming member, and the process cartridge further includes a conductive member different from the conductive part; and when the conductive part is configured to conduct electricity to the process cartridge, the conductive part is electrically connected to the first image-forming member; and the conductive member is electrically connected to the second image-forming member; and at least a part of the conductive part and at least a part of the conductive member are arranged to be staggered with each other.

8. The conductive part according to claim 1, wherein:

the conductive part includes a voltage adjustment unit, configured to adjust a voltage transferred to the image-forming member.

9. A process cartridge, wherein the process cartridge is detachably installed on an image-forming apparatus, comprising:

an image-forming member; and a conductive part, including an electrical receiving portion, an electrical transfer portion, an electrical conduction portion, and an electrical output portion, wherein the electrical transfer portion is electrically connected to the electrical receiving portion, the electrical output portion, and the electrical conduction portion respectively and configured to transfer power received by the electrical receiving portion to the electrical output portion and the electrical conduction portion, wherein:

when the conductive part is configured to conduct electricity to the process cartridge, the electrical receiving portion is electrically connected to a power supply at an outside of the process cartridge to receive a first voltage from the outside of the process cartridge; and the electrical output portion is electrically connected to an image-forming member in the process cartridge and transfers a second voltage to the image-forming member; and the electrical conduction portion outputs a third voltage to the outside of the process cartridge.

10. The process cartridge according to claim 9, wherein:

at least a part of the electrical receiving portion or at least a part of the electrical conduction portion is positioned at an outside of a housing of the process cartridge; or the electrical transfer portion or the electrical output portion is positioned at an inside of the housing of the process cartridge.

11. The process cartridge according to claim 9, wherein:

the electrical transfer portion includes a first conductive sheet and a second conductive sheet; along a length extension direction of the first conductive sheet, a first end portion of the first conductive sheet is connected to the electrical receiving portion, and a second end portion of the first conductive sheet is connected to the electrical conduction portion, wherein the first conductive sheet extends along a first direction; and along a length extension direction of the second conductive sheet, an end of the second conductive sheet is connected to the first conductive sheet, and another end of the second conductive sheet is connected to the electrical output portion, wherein the second conductive sheet extends along a second direction, and the first direction intersects the second direction; or a first end portion of the first conductive sheet is connected to the electrical receiving portion, and a second end portion of the first conductive sheet is connected to the electrical conduction portion; an end of the second conductive sheet is disposed at the outside of the housing of the process cartridge and configured to be electrically connected to the electrical conduction portion; and another end of the second conductive sheet is connected to the electrical output portion.

12. The process cartridge according to claim 9, wherein:

the image-forming member includes a photosensitive drum; the photosensitive drum includes an aluminum base, a steel axle and a conductive bearing; the aluminum base is disposed at a main body of the photosensitive drum; and the steel axle is disposed at an end portion of the main body of the photosensitive drum and electrically connected to the aluminum base; and the conductive bearing is disposed at the steel axle; and when the conductive part is configured to conduct electricity to the process cartridge, the electrical output portion is abutted against the conductive bearing; or the electrical output portion includes a hollow portion and a locking portion; when the conductive part is configured to conduct electricity to the process cartridge, the hollow portion is sleeved on an outside of the steel axle; and a conductive sleeve is disposed between the hollow portion and the steel axle, and the locking portion is abutted against the conductive sleeve.

13. The process cartridge according to claim 9, wherein:

the electrical receiving portion includes an elastic part, and the elastic part is disposed with a protrusion; and/or the electrical conduction portion includes an abutting plane.

14. The process cartridge according to claim 9, wherein:

the image-forming member includes a first image-forming member and a second image-forming member, and the process cartridge further includes a conductive member different from the conductive part; and when the conductive part is configured to conduct electricity to the process cartridge, the conductive part is electrically connected to the first image-forming member; and the conductive member is electrically connected to the second image-forming member; and at least a part of the conductive part and at least a part of the conductive member are arranged to be staggered with each other.

15. The process cartridge according to claim 9, wherein:

the electrical receiving portion is configured to be electrically connected to the image-forming apparatus to receive power transferred by the image-forming apparatus; the image-forming member includes a photosensitive drum; the electrical receiving portion is disposed on an end surface of the process cartridge; the electrical output portion is disposed on an axial end portion of the photosensitive drum; and the electrical conduction portion is disposed on a sidewall of the process cartridge; or the electrical receiving portion is configured to be electrically connected to another process cartridge to receive power transferred from the another process cartridge; the image-forming member includes a photosensitive drum; the electrical receiving portion and the electrical conduction portion are respectively disposed on two opposite sidewalls of the process cartridge; and the electrical output portion is disposed on an axial end portion of the photosensitive drum.

16. The process cartridge according to claim 9, wherein:

the process cartridge includes a storage apparatus, wherein the storage apparatus and the electrical receiving portion are positioned on a same end surface of the process cartridge, the storage apparatus is configured to record attribute information and consumption information;

the storage apparatus is disposed at the housing and includes a plurality of first conductive contacts; and the plurality of first conductive contacts are arranged along a direction perpendicular to an installation direction of the process cartridge; and when an electrical input terminal is configured to be electrically connected to the image-forming apparatus to receive power transferred by the image-forming apparatus, a projection of an extension line of a connection line of at least two of the plurality of first conductive contacts intersects a projection of an extension line of a connection line of the electrical receiving portion and the electrical conduction portion; or when the electrical receiving portion disposed on the conductive part of the process cartridge is configured to be electrically connected to another process cartridge to receive power transferred from the another process cartridge, a projection of an extension line of a connection line of at least two of the plurality of first conductive contacts intersects a projection of a connection line of the electrical receiving portion and the electrical conduction portion.

17. The process cartridge according to claim 9, wherein:

the process cartridge includes one or more conductive contacts, wherein the one or more of conductive contacts and the electrical receiving portion are positioned on a same end surface of the process cartridge; the one or more of conductive contacts are configured to be electrically connected to one or more of a developing roller, a toner feeding roller, and a charging roller in the process cartridge respectively.

18. The process cartridge according to claim 9, wherein:

the electrical receiving portion is configured to be electrically connected to the image-forming apparatus to receive power transferred by the image-forming apparatus; and when the process cartridge is installed in the image-forming apparatus, a projection of a connection line of the conductive terminal and the electrical output portion intersects a projection of a connection line of the electrical receiving portion and the electrical conduction portion the electrical receiving portion is configured to be electrically connected to the image-forming apparatus to receive power transferred by the image-forming apparatus; the process cartridge includes a first image-forming member and a second image-forming member, and a conductive member different from the conductive part; an end portion of the first image-forming member is electrically connected to the conductive part; an end portion of the second image-forming member is electrically connected to the conductive part; the conductive element includes an electrical input terminal and an electrical output terminal; the electrical input terminal is configured to be electrically connected to another conductive terminal on the main body of the image-forming apparatus; the electrical output terminal is electrically connected to the end portion of the second image-forming member; when the process cartridge is installed in the image-forming apparatus, a projection of a connection line of the conductive terminal and the electrical output terminal of the conductive member intersects a projection of a connection line of the electrical receiving portion and the electrical conduction portion; and/or when the process cartridge is installed in the image-forming apparatus, a projection of a connection line of another conductive terminal and at least one of the electrical output terminal and the electrical output portion intersects a projection of a connection line of the electrical receiving portion and the electrical conduction portion; and/or when the process cartridge is installed in the image-forming apparatus, a projection of an extension line of a connection line of another conductive terminal and at least one of the electrical output terminal and the electrical output portion intersects a projection of an extension line of a connection line of the electrical receiving portion and the electrical conduction portion; or when the electrical receiving portion disposed on the conductive part of current process cartridge is configured to be electrically connected to an electrical conduction portion disposed on a conductive part of another process cartridge to receive power transferred from the another process cartridge, the process cartridge includes a first imaging member, a second imaging member, and a conductive member different from the conductive part; an end portion of the first image-forming member is electrically connected to the conductive part; an end portion of the second image-forming member is electrically connected to the conductive element; the conductive element includes an electrical input terminal and an electrical output terminal; the electrical output terminal is electrically connected to the end portion of the second image-forming member; the electrical input terminal is configured to be electrically connected to another second conductive terminal disposed on the main body of the image-forming apparatus to receive power transferred by the main body of the image-forming apparatus; when the process cartridge is installed in the image-forming apparatus, a projection of a connection line of another second conductive terminal and the electrical output terminal or the electrical output portion intersects a projection of a connection line of the electrical receiving portion and the electrical conduction portion; and/or a projection of a connection line of the conductive terminal and the electrical output portion or the electrical output terminal intersects the projection of the connection line of the electrical receiving portion and the electrical conduction portion.

19. The process cartridge according to claim 9, wherein: the process cartridge includes one or more conductive contacts, wherein the one or more of conductive contacts and the electrical receiving portion are positioned on a same end surface of the process cartridge; and the one or more conductive contacts are configured to be electrically connected to one or more conductive terminals on the image-forming apparatus to receive power transferred by the image-forming apparatus.

20. A process cartridge set, comprising:

a first process cartridge, including a first image-forming member and a first conductive part, wherein a first conductive part is electrically connected to the first image-forming member; the first conductive part includes a first electrical receiving portion, a first electrical transfer portion, a first electrical output portion and a first electrical conduction portion; and the first electrical transfer portion is electrically connected to the first electrical receiving portion, the first electrical output portion and the first electrical conduction portion respectively;

a second process cartridge, including a second image-forming member and a second conductive part, wherein a second conductive part is electrically connected to the second image-forming member; the second conductive part includes a second electrical receiving portion, a second electrical transfer portion, a second electrical output portion and a second electrical conduction portion; and the second electrical transfer portion is electrically connected to the second electrical receiving portion, the second electrical output portion and the second electrical conduction portion respectively; and the first electrical receiving portion is configured to be electrically connected to a conductive terminal on an image-forming apparatus; the first electrical output portion is electrically connected to the first image-forming member; the second electrical output portion is electrically connected to the second image-forming member; and the first electrical conduction portion is electrically connected to the second electrical receiving portion.

* * * * *